US011533592B2

(12) United States Patent
Cao et al.

(10) Patent No.: US 11,533,592 B2
(45) Date of Patent: Dec. 20, 2022

(54) MIDAMBLE FORMAT FOR PACKETS IN A VEHICULAR COMMUNICATION NETWORK

(71) Applicant: Marvell Asia Pte, Ltd., Singapore (SG)

(72) Inventors: Rui Cao, Sunnyvale, CA (US); Prashant Sharma, Santa Clara, CA (US); Hongyuan Zhang, Fremont, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 17/011,712

(22) Filed: Sep. 3, 2020

(65) Prior Publication Data
US 2021/0076179 A1     Mar. 11, 2021

Related U.S. Application Data

(60) Provisional application No. 62/897,130, filed on Sep. 6, 2019.

(51) Int. Cl.
| | |
|---|---|
| *H04W 4/40* | (2018.01) |
| *H04L 27/26* | (2006.01) |
| *H04W 80/02* | (2009.01) |
| *H04W 84/12* | (2009.01) |

(52) U.S. Cl.
CPC ........... *H04W 4/40* (2018.02); *H04L 27/2605* (2013.01); *H04W 80/02* (2013.01); *H04W 84/12* (2013.01)

(58) Field of Classification Search
CPC ....... H04W 4/40; H04W 80/02; H04W 84/12; H04L 27/2605
See application file for complete search history.

(56) References Cited

U.S. PATENT DOCUMENTS

| | | |
|---|---|---|
| 6,721,294 B1 | 4/2004 | Bahrenburg et al. |
| 9,706,599 B1 | 7/2017 | Zhang et al. |
| 10,368,391 B1 | 7/2019 | Zhang et al. |
| 2012/0327871 A1 | 12/2012 | Ghosh et al. |
| 2019/0173710 A1 | 6/2019 | Cao et al. |

(Continued)

OTHER PUBLICATIONS

International Search Report and Written Opinion in PCT Patent Application No. PCT/US2020/049190, dated Nov. 24, 2020 (21 pages).

(Continued)

*Primary Examiner* — Samina F Choudhry

(57) ABSTRACT

In a vehicular communication network, a communication device generates a physical layer (PHY) preamble of a PHY protocol data unit (PPDU) for transmission in the vehicular communication network. The communication device generates a plurality of PHY data segments of the PPDU, and one or more PHY midambles, each PHY midamble to be transmitted between a respective pair of adjacent PHY data segments, and each PHY midamble including one or more training signal fields. Generating the one or more PHY midambles includes, when the PPDU is to be transmitted according to an extended range (ER) mode, generating each training signal field to include i) a first portion based on a very high throughput long training field (VHT-LTF) defined by the IEEE 802.11ac Standard and ii) a second portion based on the VHT-LTF defined by the IEEE 802.11ac Standard; and transmitting, by the communication device, the PPDU in the vehicular communication network.

22 Claims, 8 Drawing Sheets

(56) References Cited

U.S. PATENT DOCUMENTS

2019/0297146 A1* 9/2019 Noh .................. H04W 4/44

OTHER PUBLICATIONS

Noh et al., "PHY designs for Ngv," IEEE Draft, doc. IEEE 802.11-19/0293r1, 21 pages (dated Mar. 10, 2019).

Noh et al., "Compressed Midamble in NGV," IEEE Doc. No. IEEE 802.11-19/1152r0, 44 pages (dated Jul. 14, 2019).

Sharma et al., "Midamble Compression," IEEE Doc. No. IEEE 802.11-19/0685r2, 20 pages (dated May 16, 2019).

Perahia et al., "Next Generation Wireless LANs: 802.11n and 802.11ac," Cambridge University Press, pp. 74-88 (Jan. 1, 2013).

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE P802.11ax™/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

Sadeghi, "802.11bd Specification Framework Document," rev. 5, doc. no. IEEE 802.11-15/0132r05, *The Institute of Electrical and Electronics Engineers*, Nov. 19, 2019 (9 pages).

Sun et al., "Motion Booklet for IEEE 802.11 TGbd," Document No. IEEE 802.11-19/0514r12, The Institute of Electrical and Electronics Engineers (IEEE), 77 pages, Mar. 14, 2019.

\* cited by examiner

MIDAMBLE FORMAT FOR PACKETS IN A VEHICULAR COMMUNICATION NETWORK

CROSS-REFERENCES TO RELATED APPLICATIONS

This application claims the benefit of U.S. Provisional Patent Application No. 62/897,130, entitled "Next-Generation Vehicular (NGV) Midamble Format," filed on Sep. 6, 2019, which is incorporated herein by reference in its entirety.

FIELD OF THE DISCLOSURE

The present disclosure relates generally to vehicular communication networks and, more particularly, to physical layer protocol data unit formats.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

The IEEE 802.11p Standard specifies protocols for wireless access in vehicular environments (WAVE). Future WAVE standards, such as the IEEE 802.11bd Standard (now under development) are aimed at delivering improved car-to-car or car-to-infrastructure connectivity, throughput, infotainment features, etc. Some challenges encountered in vehicular communication networks are caused by the relatively fast movement of transmitters and receivers. For example, when a transmitter and/or a receiver are moving relative to one another at a high rate of speed, channel conditions may change significantly during the transmission of a packet.

SUMMARY

In an embodiment, a method for wireless communication in a vehicular communication network includes: generating, at a communication device, a physical layer (PHY) preamble of a PHY protocol data unit (PPDU) for transmission in the vehicular communication network according to a communication protocol for vehicular communications; generating, at the communication device, a plurality of PHY data segments of the PPDU; generating, at the communication device, one or more PHY midambles, each PHY midamble to be transmitted between a respective pair of adjacent PHY data segments, and each PHY midamble including one or more training signal fields, wherein generating the one or more PHY midambles includes, when the PPDU is to be transmitted according to an extended range (ER) mode defined by the communication protocol, generating each training signal field to include i) a first portion based on a very high throughput long training field (VHT-LTF) defined by the IEEE 802.11ac Standard and ii) a second portion based on the VHT-LTF defined by the IEEE 802.11ac Standard; and transmitting, by the communication device, the PPDU in the vehicular communication network.

In another embodiment, a communication device is configured to operate in a vehicular communication network, and comprises a wireless network interface device. The wireless network interface device includes one or more IC devices configured to: generate a PHY preamble of a PPDU for transmission in the vehicular communication network according to a communication protocol for vehicular communications; generate a plurality of PHY data segments of the PPDU; generate one or more PHY midambles, each PHY midamble to be transmitted between a respective pair of adjacent PHY data segments, and each PHY midamble including one or more training signal fields, wherein generating the one or more PHY midambles includes, when the PPDU is to be transmitted according to an extended range (ER) mode defined by the communication protocol, generating each training signal field to include i) a first portion based on a VHT-LTF defined by the IEEE 802.11ac Standard and ii) a second portion based on the VHT-LTF defined by the IEEE 802.11ac Standard; and control the wireless network interface device to transmit the PPDU in the vehicular communication network.

In yet another embodiment, a method for accessing a communication channel in a vehicular communication network includes: generating, at a communication device, a PHY preamble of a PPDU for transmission in the vehicular communication network according to a communication protocol for vehicular communications; generating, at the communication device, a plurality of PHY data segments of the PPDU; selecting, at the communication device, a format of one or more PHY midambles from a set of multiple different PHY midamble formats based on a mode of transmission of the PPDU, wherein the set of multiple different PHY midamble formats includes i) a first format corresponding to an extended range transmission mode defined by the communication protocol, the first format using uncompressed training signal fields, and ii) a second format corresponding to a high throughput transmission mode defined by the communication protocol, the second format using compressed training signal fields; generating, at the communication device, the one or more PHY midambles according to the selected format, each PHY midamble to be transmitted between a respective pair of adjacent PHY data segments, and each PHY midamble including one or more training signal fields, wherein generating each PHY midamble includes i) selectively including an uncompressed training signal field when the first format is selected, and ii) selectively including a compressed training signal field when the second format is selected; and transmitting, by the communication device, the PPDU in the vehicular communication network.

In still another embodiment, a communication device is configured to operate in a vehicular communication network, and comprises a wireless network interface device. The wireless network interface device includes one or more IC devices configured to: generate a PHY preamble of a PPDU for transmission in the vehicular communication network according to a communication protocol for vehicular communications; generate a plurality of PHY data segments of the PPDU; select a format of one or more PHY midambles from a set of multiple different PHY midamble formats based on a mode of transmission of the PPDU, wherein the set of multiple different PHY midamble formats includes i) a first format corresponding to an extended range transmission mode defined by the communication protocol, the first format using uncompressed training signal fields, and ii) a second format corresponding to a high throughput transmission mode defined by the communication protocol, the second format using compressed training signal fields; generate the one or more PHY midambles according to the selected format, each PHY midamble to be transmitted between a respective pair of adjacent PHY data segments, and each PHY midamble including one or more training signal fields, wherein generating each PHY midamble includes i) selectively including an uncompressed training signal field when the first format is selected, and ii) selectively including a compressed training signal field when the second format is selected; and control the wireless network interface device to transmit the PPDU in the vehicular communication network.

DETAILED DESCRIPTION

In embodiments described below, a vehicular communication network includes communication devices, such access points and client stations, that operate according to one or more protocols that define wireless access in vehicular environments (WAVE) communications. In an embodiment, the access points are embedded in roadside units and the client stations are embedded in moving vehicles operating in the vehicular communication network. In an embodiment, client stations that are operating in the vehicular communication network communicate with other client stations and/or roadside units to exchange information, such as safety warnings, traffic information, etc., that may enhance safety, improve driving experience, etc., of the moving vehicle, in an embodiment. To improve performance in the vehicular communication network (e.g., to mitigate Doppler effects), packets transmitted in the vehicular communication network are generated to include physical layer (PHY) midambles that allow a receiver to update a channel estimate during reception of a packet. Various example PHY midamble formats are described below.

Figure 1:
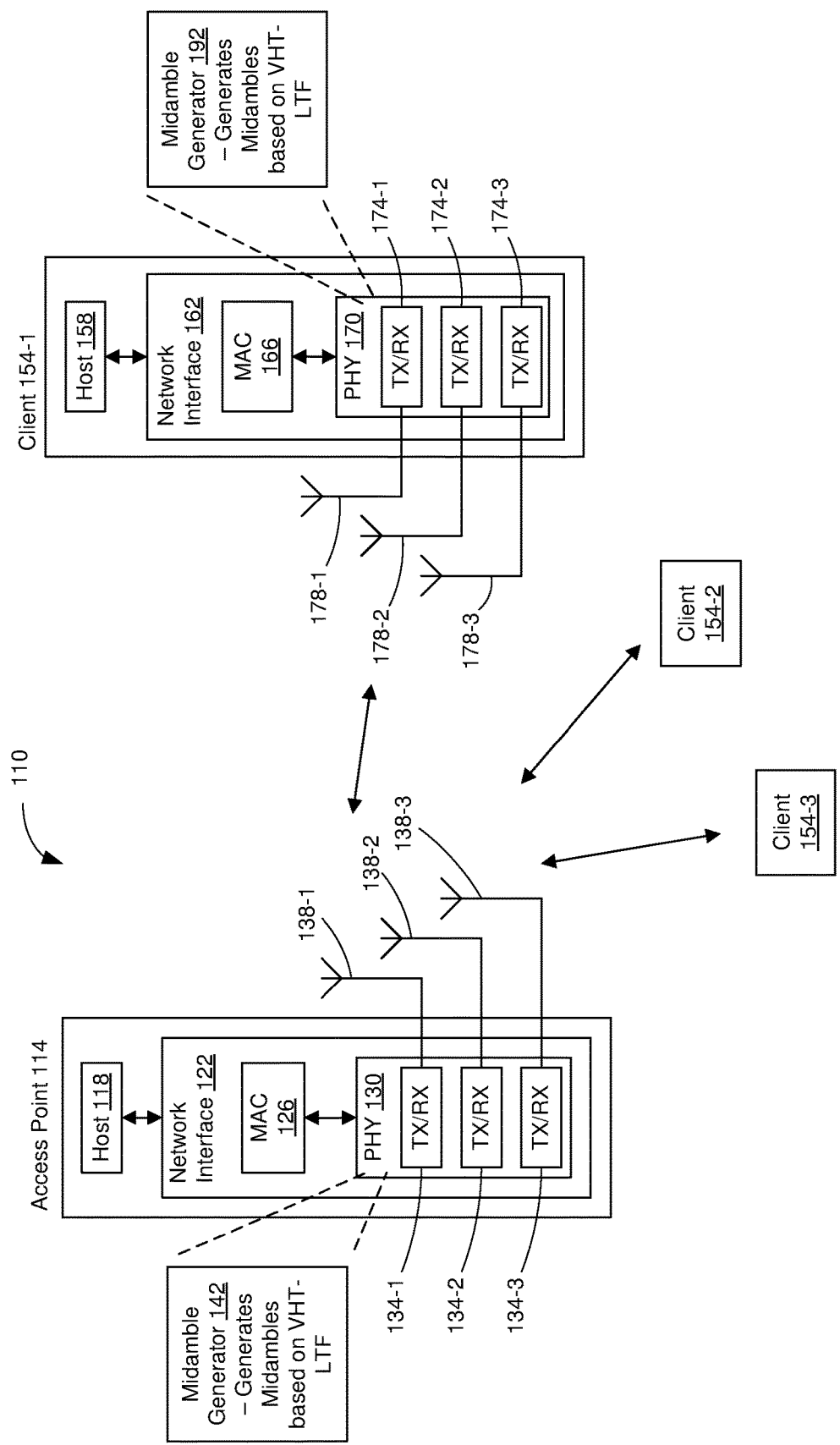
FIG. 1 is a block diagram of an example vehicular communication network, according to an embodiment.

FIG. 1 is a block diagram of an example vehicular communication network 110, according to an embodiment. The vehicular communication network 110 includes an access point (AP) 114. The AP 114 corresponds to a roadside unit operating in the vehicular communication network, in an embodiment. The AP 114 comprises a host processor 118 coupled to a network interface device 122. The network interface device 122 includes a medium access control (MAC) processor 126 and a PHY processor 130, in an embodiment. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a greater number of antennas 138 than transceivers 134, and antenna switching techniques are utilized. In one embodiment, the MAC processor 126 and the PHY processor 130 are configured to operate according to at least a first communication protocol (e.g., the IEEE 802.11bd Standard or another suitable communication protocol designed for vehicular communications). In another embodiment, the MAC processor 126 and the PHY processor 130 are also configured to operate according to a second communication protocol (e.g., the IEEE 802.11p Standard or another suitable communication protocol designed for vehicular communications) different than the first communication protocol. In some embodiments, the second communication protocol is a legacy communication protocol with regard to the first communication protocol.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130. As yet another example, the entirety of the MAC processor 126 and the entirety of the PHY processor 130 may be implemented on a single IC.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network interface device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to the first communication protocol. For example, the MAC processor 126 is configured to implement MAC layer functions, including MAC layer functions of the first communication protocol, and the PHY processor 130 is configured to implement PHY functions, including PHY functions of the first communication protocol. For instance, the MAC processor 126 is configured to generate MAC layer data units such as MAC service data units (MSDUs), MPDUs, A-MPDUs, etc., and provide the MAC layer data units to the PHY processor 130.

The PHY processor 130 is configured to receive MAC layer data units from the MAC processor 126 and to encapsulate the MAC layer data units to generate PHY data units such as PHY protocol data units (PPDUs), PHY protocol service data units (PSDUs), etc., for transmission via the antennas 138. Similarly, the PHY processor 130 is configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes one or more forward error correction (FEC) encoders (e.g., a binary convolutional code (BCC) encoder, a low density parity check (LDPC) encoder, etc.), one or more FEC decoders (e.g., a BCC decoder, an LDPC decoder, etc.), amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine that is configured to perform MAC layer functions, control the PHY processor 130, etc.

In some embodiments, the first communication protocol defines a plurality of transmission modes, and the PHY processor 130 is configured to generate PPDUs with formats and/or contents that vary for the different transmission modes. As an example, the plurality of transmission modes includes an extended range (ER) mode and one or more non-ER modes. The ER mode is designed to increase a range at which a PPDU can be correctly decoded by receivers, according to an embodiment. As an example, the ER mode employs modulation techniques and/or coding techniques that utilize increased redundancy at the expense of data throughput. In another embodiment, the plurality of transmission modes additionally or alternatively includes a high throughput mode, which may use more complex modulation techniques that increase throughput but decrease a range at which a PPDU can be correctly decoded. In another embodiment, the plurality of transmission modes includes i) an ER mode such as discussed above, ii) a high throughput mode such as discussed above, and iii) a default transmission mode. The default mode is designed generally to provide a range of reception that tends to fall in between those of the ER mode and the high throughput mode, and generally to provide data throughputs that tend to fall in between those in the ER mode and in the high throughput mode, according to an embodiment.

In an embodiment, the network interface device 122 includes (e.g., the PHY processor 130 includes) a PHY midamble generator 142 that is configured to generate PHY midambles based on the very high throughput long training field (VHT-LTF) defined by the IEEE 802.11ac Standard. In some embodiments, the PHY midamble generator 142 is configured to generate one or more PHY midambles for a PPDU to have different content depending on a transmission mode of the PPDU. According to various embodiments, the PHY midamble generator 142 is configured to generate one or more PHY midambles having formats such as described below, or having other suitable PHY midamble formats.

In an embodiment, the PHY midamble generator 142 includes a hardware circuitry that is configured to generate PHY midambles such as described below, or other suitable PHY midambles. In an embodiment, the PHY midamble generator 142 additionally or alternatively is implemented by a processor configured to execute machine readable instructions stored in a memory device (not shown) such as a RAM, a ROM, a flash memory, etc., in various embodiments.

The vehicular communication network 110 includes a plurality of client stations 154. Each client station 154 is included in a respective vehicle, according to an embodiment. For example, the AP 114 is located along a roadway, and the plurality of client stations 154 are within vehicles traveling on the roadway, according to an illustrative embodiments. Although three client stations 154 are illustrated in FIG. 1, the vehicular communication network 110 includes other suitable numbers (e.g., 1, 2, 4, 5, 6, etc.) of client stations 154 in various embodiments.

The client station 154-1 includes a host processor 158 coupled to a network interface device 162. The network interface device 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized. In various embodiments, the MAC processor 126 and the PHY processor 130 are configured to operate according to at least the first communication protocol (e.g., the IEEE 802.11bd Standard) and/or the second communication protocol (e.g., the IEEE 802.11p Standard).

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170. As yet another example, the entirety of the MAC processor 166 and the entirety of the PHY processor 170 may be implemented on a single IC.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network interface device 162 may be implemented, at least partially, on a second IC. As another example, the host processor 158 and at least a portion of the network interface device 162 may be implemented on a single IC.

In various embodiments, the MAC processor 166 and the PHY processor 170 of the client station 154-1 are configured to generate data units, and process received data units, that conform to the first communication protocol or another suitable communication protocol. For example, the MAC processor 166 is configured to implement MAC layer functions, including MAC layer functions of the first communication protocol, and the PHY processor 170 is configured to implement PHY functions, including PHY functions of the first communication protocol. For instance, the MAC processor 166 is configured to generate MAC layer data units such as MAC service data units (MSDUs), MPDUs, A-MPDUs, etc., and provide the MAC layer data units to the PHY processor 170.

The PHY processor 170 is configured to receive MAC layer data units from the MAC processor 166 and to encapsulate the MAC layer data units to generate PHY data units such as PHY protocol data units (PPDUs), PHY protocol service data units (PSDUs), etc., for transmission via the antennas 174. Similarly, the PHY processor 170 is configured to receive PHY data units that were received via the antennas 174, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more radio frequency (RF) signals received via the one or more antennas 174 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes one or more forward error correction (FEC) encoders (e.g., a binary convolutional code (BCC) encoder, a low density parity check (LDPC) encoder, etc.), one or more FEC decoders (e.g., a BCC decoder, an LDPC decoder, etc.), amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals, for example by providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine that is configured to perform MAC layer functions, control the PHY processor 170, etc.

In some embodiments, the PHY processor 170 is configured to generate PPDUs with formats and/or contents that vary for the different transmission modes defined by the first communication protocol, similar to the PHY processor 130 described above.

In an embodiment, the network interface device 162 includes (e.g., the PHY processor 170 includes) a PHY midamble generator 192 that is configured to generate PHY midambles based on the VHT-LTF defined by the IEEE 802.11ac Standard. In some embodiments, the PHY midamble generator 192 is configured to generate one or more PHY midambles for a PPDU to have different content depending on a transmission mode of the PPDU. According to various embodiments, the PHY midamble generator 192 is configured to generate one or more PHY midambles having formats such as described below, or having other suitable PHY midamble formats.

In an embodiment, the PHY midamble generator 192 includes a hardware circuitry that is configured to generate PHY midambles such as described below, or other suitable PHY midambles. In an embodiment, the PHY midamble generator 192 additionally or alternatively is implemented by a processor configured to execute machine readable instructions stored in a memory device (not shown) such as a RAM, a ROM, a flash memory, etc., in various embodiments.

Although FIG. 1 depicts communications between the AP 114 and respective client stations 154, two or more client stations 154 communicate directly with one another, according to some embodiments. For example, the vehicular communication network 110 permits direct client-to-client communications that are not routed through the AP 114, according to some embodiments.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2A:
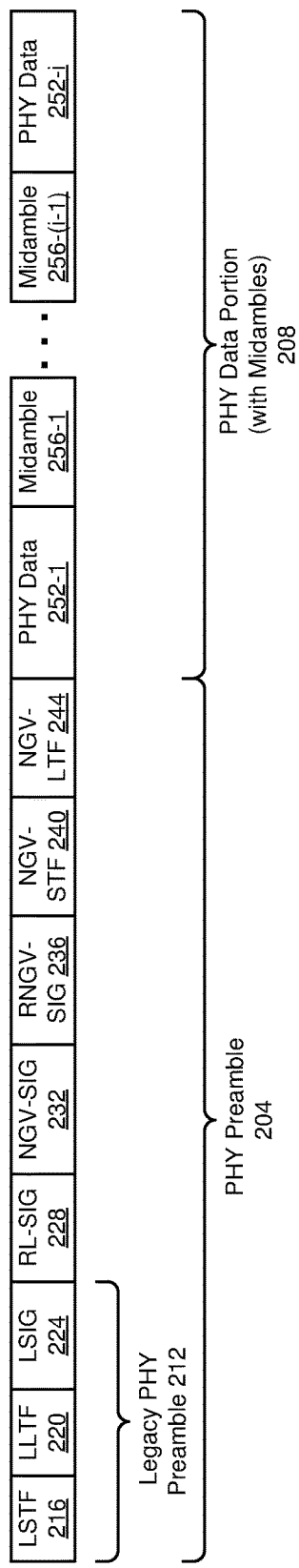
FIG. 2A is a diagram of an example physical layer protocol data unit (PPDU) for transmission in the vehicular communication network of FIG. 1, according to an embodiment.

FIG. 2A is a diagram of an example PPDU 200 for transmission in a vehicular communication network such as the vehicular communication network 110 (FIG. 1), according to an embodiment. The network interface device 122 (FIG. 1) is configured to generate and transmit a PPDU such as the PPDU 200 to one or more client stations 154, according to an embodiment. The network interface device 162 (FIG. 1) is also configured to generate and transmit a PPDU such as the PPDU 200 to the AP 114 or to another client station 154, in an embodiment. In an embodiment, the PHY processor 130/170 is configured to generate a PPDU such as the PPDU 200. In an embodiment, the PHY processor 130/170 is configured to receive and process a PPDU such as the PPDU 200.

The PPDU 200 conforms to the first communication protocol (e.g., the IEEE 802.11bd Standard), according to an embodiment. In various embodiments, the PPDU 200 spans a suitable bandwidth such as 10 MHz, 20 MHz, etc. In other embodiments, PPDUs similar to the PPDU 200 occupy different bandwidths such as 5 MHz, 40 MHz, or any suitable bandwidth. The PPDU is suitable for "mixed mode" situations, i.e., when the vehicular communication network 100 includes a client station (i.e., the legacy client station 154-4) that conforms to a legacy communication protocol (e.g., the IEEE 802.11p Standard), but not the first communication protocol (e.g., the IEEE 802.11bd Standard). The data unit 200 can be utilized in other situations as well.

The PPDU 200 includes a PHY preamble 204 and a PHY data portion 208. The PHY preamble 204 includes a legacy PHY preamble portion 212 that conforms to the second communication protocol, according to an embodiment. In an embodiment, the legacy PHY preamble portion 212 includes a legacy short training field (LSTF) 216, generally used for packet detection, initial synchronization, and automatic gain control (AGC) adjustment, and a legacy long training field (LLTF) 212, generally used for channel estimation and fine synchronization. The legacy PHY preamble portion 212 also includes a legacy signal field (LSIG) 224. In an embodiment, the LSIG 224 includes a signal field defined by the second communication protocol and includes information regarding the PPDU 200, such as a duration of the PPDU 200. For example, in an embodiment, the LSIG 224 includes a rate subfield (not shown) and a length subfield (not shown) that together indicate the duration of the PPDU 200. In some embodiments, the duration information in the LSIG 224 permits client stations and/or APs that conform to the second communication protocol but do not conform to the first communication protocol (e.g., legacy communication devices) to determine the duration of the PPDU 200. In some embodiments, such devices will refrain from transmitting until after an end of transmission of the PPDU 200 and therefore will not interfere with the transmission of the PPDU 200.

In some embodiments, the PHY preamble 204 includes a repetition of the LSIG 224, referred to as repeated LSIG (RL-SIG) 228. The RL-SIG 228 provides redundancy of the LSIG 224 and therefore improves decoding of LSIG 224 at a receiver. In some embodiments, the first communication protocol defines a plurality of transmission modes, including an ER mode and one or more non-ER modes (such as one or both of a high throughput mode and a default mode), and the RL-SIG 228 is only included in the PPDU 200 when the PPDU 200 conforms to the ER mode. In other embodiments, the RL-SIG 228 is also included for one or more non-ER modes defined by the first communication protocol. In some embodiments, the RL-SIG 228 is included for all transmission modes defined by the first communication protocol.

The PHY preamble 204 also includes a signal field 232 that conforms to the first communication protocol. The signal field 232 is sometimes referred to as the next generation vehicular (NGV) signal field (NGV-SIG) 232. The NGV-SIG 232 conforms to the first communication protocol and is decodable by a communication device that is configured to operate according to the first communication protocol, in an embodiment. The NGV-SIG 232 includes one or more subfields that indicate PHY parameters corresponding to the PHY data portion 208, such a modulation and coding scheme (MCS) subfield that indicates an MCS with which the data portion 220 is encoded, a dual sub-carrier modulation (DCM) subfield that indicates whether a dual sub-carrier feature (e.g., DCM) is enabled along with suitable parameters (e.g., carrier spacing), etc., in an embodiment. In some embodiments, the NGV-SIG 232 includes a subfield that indicates a PHY midamble periodicity for the PHY data portion 208. In an embodiment, the PHY midamble periodicity indicates a number of orthogonal frequency division multiplexing (OFDM) symbols between adjacent PHY midambles in the PHY data portion 208.

In some embodiments, the PHY preamble 204 includes a repetition of the NGV-SIG 232, referred to as repeated NGV-SIG (RNGV-SIG) 236. For example, a copy of all of the bits of the NGV-SIG 232 are included in the RNGV-SIG 236. The RNGV-SIG 236 provides redundancy of the NGV-SIG 232 and therefore improves decoding of NGV-SIG 232 at a receiver. In some embodiments, the first communication protocol defines a plurality of transmission modes, including an ER mode and one or more non-ER modes, and the RNGV-SIG 236 is only included in the PPDU 200 when the PPDU 200 conforms to the ER mode. In other embodiments, the RNGV-SIG 236 is also included for one or more non-ER modes defined by the first communication protocol. In some embodiments, the RNGV-SIG 236 is included for all transmission modes defined by the first communication protocol.

The PHY preamble 204 also includes an NGV short training field (NGV-STF) 240. In some embodiments, the NGV-STF 240 is used by a receiver for synchronization and AGC adjustment. Additionally, the PHY preamble 204 includes one or more NGV long training fields (NGV-LTFs) 244. In some embodiments, the one or more NGV-LTFs 244 are used by a receiver for channel estimation. In an embodiment, a number of NGV-LTFs 244 corresponds to a number of spatial streams via which the PPDU 200 is being transmitted. As an illustrative example, only one NGV-LTF 244 is included when the PPDU 200 is to be transmitted via one spatial stream, and two NGV-LTFs 244 are included when the PPDU 200 is to be transmitted via two spatial streams.

The PHY data portion 208 includes a plurality of (e.g., a positive integer i greater than one) PHY data segments 252 and one or more PHY midambles 256, according to an embodiment. In an embodiment, the PHY data segments 252-1 to 252-(i−1) include M OFDM symbols, where M is a suitable positive integer. In an embodiment, each PHY midamble includes one or more training signal fields, which are described below.

In an embodiment, the PHY preamble 204 includes a plurality OFDM symbols, and each field of the PHY preamble 204, such as the fields illustrated in FIG. 2A, comprises one or more OFDM symbols. In an embodiment, a portion of the PHY preamble 204 (e.g., the legacy PHY preamble 212, the RL-SIG 228 (if included), the NGV-SIG 232, and the RNGV-SIG 236 (if included)) is generated based on an OFDM numerology defined, by a third wireless communication standard, for a bandwidth that is larger the bandwidth of the PPDU 200, and using a down-clocking factor to generate the portion of the PHY preamble 204 to span a narrower bandwidth of the PPDU 200. For example, the portion of the PHY preamble 204 is generated based on an OFDM numerology defined, by the IEEE 802.11a Standard, for a 20 MHz bandwidth, and using a down-clocking factor of two (×2) to generate the PHY preamble 202 to span a 10 MHz bandwidth of the PHY preamble 204. For example, OFDM symbols of the portion of the PHY preamble 204 are generated using a same FFT size and, accordingly, a same number of OFDM tones as defined for a 20 MHz bandwidth by the IEEE 802.11a Standard, but using a sampling rate that is reduced (down-clocked) by a factor of two (×2) with respect to the sampling rate specified by the IEEE 802.11a Standard. Accordingly, in an embodiment, OFDM tone spacing in the portion of the PHY preamble 204 is reduced by a factor of two (×2) with respect to the OFDM tone spacing defined by the IEEE 802.11a Standard. In an embodiment, the OFDM numerology and the down-clocking factor used for generating the portion of the PHY preamble 204 correspond to the OFDM numerology and the down-clocking factor specified for generating a PHY preamble according to the second communication protocol (e.g., the IEEE 802.11p Standard).

In an embodiment, the PHY data portion 208 includes a plurality of OFDM symbols, and each field of the PHY data portion 208, such as the PHY data segments 252 and the PHY midamble(s) 256, comprises one or more OFDM symbols. Each OFDM symbol of the PHY data portion 208 is generated based on an OFDM numerology defined, by a fourth wireless communication standard, for a bandwidth that is larger the bandwidth of the PPDU 200, and using a down-clocking factor to generate the PHY data portion 208 to span a narrower bandwidth of the PPDU 200. For example, the PHY data portion 208 is generated based on an OFDM numerology defined, by the IEEE 802.11ac Standard, for a 20 MHz bandwidth, and using a down-clocking factor of two (×2) to generate the PHY data portion 208 to span a 10 MHz bandwidth. Accordingly, for a 10 MHz-wide PPDU, each OFDM symbol in the PHY data portion 208 has the same format as specified for a 40 MHz bandwidth in the IEEE 802.11ac Standard but with tone spacing reduced by a factor of two (×2), in an embodiment. In an embodiment, whereas an OFDM symbol generated for a 20 MHz bandwidth according to the IEEE 802.11ac Standard includes 64 tones with 156.25 kHz spacing between consecutive OFDM tones, each OFDM symbol of the PHY data portion 208 includes 64 tones with 78.125 kHz spacing between consecutive OFDM tones.

In some embodiments, each of the NGV-STF 240 and the NGV-LTF(s) 244 includes an OFDM symbol that is generated based on the OFDM numerology defined by the fourth wireless communication standard for the bandwidth that is larger the bandwidth of the PPDU 200, and using the down-clocking factor to generate the NGV-STF 240 and the NGV-LTF(s) 244 to span the narrower bandwidth of the PPDU 200. For example, the NGV-STF 240 and the NGV-LTF(s) 244 are generated based on the OFDM numerology defined, by the IEEE 802.11ac Standard, for the 20 MHz bandwidth, and using the down-clocking factor of two (×2) to generate the NGV-STF 240 and the NGV-LTF(s) 244 to span a 10 MHz bandwidth. Accordingly, for a 10 MHz-wide PPDU, each OFDM symbol in the NGV-STF 240 and the NGV-LTF(s) 244 has the same format as specified for a 40 MHz bandwidth in the IEEE 802.11ac Standard but with tone spacing reduced by a factor of two (×2), in an embodiment.

Figure 2B:
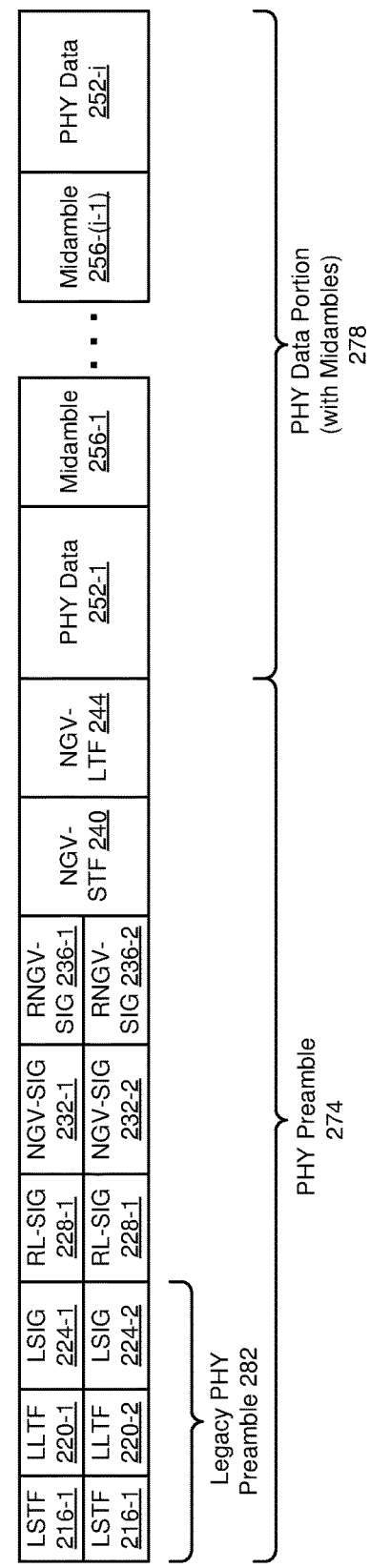
FIG. 2B is a diagram of another example PPDU for transmission in the vehicular communication network of FIG. 1, according to an embodiment.

FIG. 2B is a diagram of another example PPDU 270 for transmission in a vehicular communication network such as the vehicular communication network 110 (FIG. 1), according to an embodiment. The network interface device 122 (FIG. 1) is configured to generate and transmit a PPDU such as the PPDU 270 to one or more client stations 154, according to an embodiment. The network interface device 162 (FIG. 1) is also configured to generate and transmit a PPDU such as the PPDU 270 to the AP 114 or to another client station 154, in an embodiment. In an embodiment, the PHY processor 130/170 is configured to generate a PPDU such as the PPDU 270. In an embodiment, the PHY processor 130/170 is configured to receive and process a PPDU such as the PPDU 270.

The PPDU 270 conforms to the first communication protocol (e.g., the IEEE 802.11bd Standard), according to an embodiment. In an embodiment, the PPDU 200 of FIG. 2A spans a frequency bandwidth of 10 MHz, whereas the PPDU 270 of FIG. 2B spans a frequency bandwidth of 20 MHz. The PPDU 270 of FIG. 2B is similar to the PPDU 200 of FIG. 2A, and like-numbered elements are not described in detail for purposes of brevity.

The PPDU 270 includes a PHY preamble 274 and a PHY data portion 278. The PHY preamble 274 includes a legacy PHY preamble portion 282. The LSTF 216, the LLTF 220, the LSIG 224, the RL-SIG 228 (if included), the NGV-SIG 232, and the RNGV-SIG 236 (if included) are duplicated in each of two 10 MHz frequency subbands. In an embodiment, because the legacy PHY preamble 282 is duplicated in multiple subbands and is generated based on an OFDM numerology using a down-clocking factor specified for generating a PHY preamble according to the second communication protocol, a legacy or a non-legacy communication device that is operating using a communication channel that corresponds to a 10 MHz subband of the PPDU 270 is able to detect the PPDU 270 based on a portion of the legacy PHY preamble 282 in the corresponding 10 MHz subband. In an embodiment, a legacy communication device is configured to determine a duration corresponding to transmission of the PPDU 270 based on the duration information in one of the LSIG 224 in the corresponding 10 MHz subband, and to wait for the determined duration before attempting to transmit in the communication medium, in an embodiment. For example, in an embodiment, each LSIG 224 has a format at least substantially as specified in the IEEE 802.11p Standard and includes information that permits a legacy communication device that is configured according to operate the IEEE 802.11p Standard, but not the IEEE 802.11bd Standard, to determine a duration corresponding to transmission of the PPDU 270 and to wait for the determined duration before attempting to transmit in the communication medium.

In an embodiment, each OFDM symbol in the NGV-STF 240, the NGV-LTF 244, and the PHY data portion 278 is generated to span the entire bandwidth of the PPDU 270.

Referring now to FIGS. 2A-2B, the LSTF 216 and the LLTF 220 are power boosted as compared to other fields of the PPDU 200/270 when transmitting the PPDU 200/270 in the ER mode, according to an embodiment. As an illustrative example, the LSTF 216 and the LLTF 220 are power boosted by 3 dB as compared to other fields of the PPDU 200/270 when transmitting the PPDU 200/270 in the ER mode. In other embodiments, the LSTF 216 and the LLTF 220 are power boosted by a suitable amount other than 3 dB (e.g., 2 dB, 4 dB, etc.) when transmitting the PPDU 200/270 in the ER mode.

Referring again to FIGS. 2A-2B, the PHY midambles 256 include training signal fields that permit a receiver to update an existing channel estimate, or regenerate a channel estimate, while receiving the PPDU 200/270, which is useful for vehicular communication environments in which one or multiple communication devices are moving at relatively high speeds. As an illustrative example, movement of a transmitter and/or a receiver may cause a Doppler effect at the receiver, and the training signal fields of the PHY midambles 256 help the receiver to update or regenerate a channel estimate to mitigate the Doppler effect, according to an embodiment.

In an embodiment, each midamble 256 includes a number of training signal fields that corresponds to a number of spatial streams via which the PPDU 200 is being transmitted. As an illustrative example, each midamble 256 is a single training signal field when the PPDU 200/270 is being transmitted via a single spatial stream, and includes two training signal fields when the PPDU 200/270 is being transmitted via two spatial streams.

In an embodiment, each training signal field of the midamble(s) 256 is based on the VHT-LTF defined by the IEEE 802.11ac Standard. For example, for a 10 MHz PPDU, such as the PPDU 200 of FIG. 2A, each training signal field of the midamble(s) 256 is generated as a 2× downclock version of the VHT-LTF defined by the IEEE 802.11ac Standard for 20 MHz PPDUs, according to an embodiment. In another example, for a 20 MHz PPDU, such as the PPDU 270 of FIG. 2B, each training signal field of the midamble(s) 256 is generated as a 2× downclock version of the VHT-LTF defined by the IEEE 802.11ac Standard for 40 MHz PPDUs, according to an embodiment.

Figure 3:
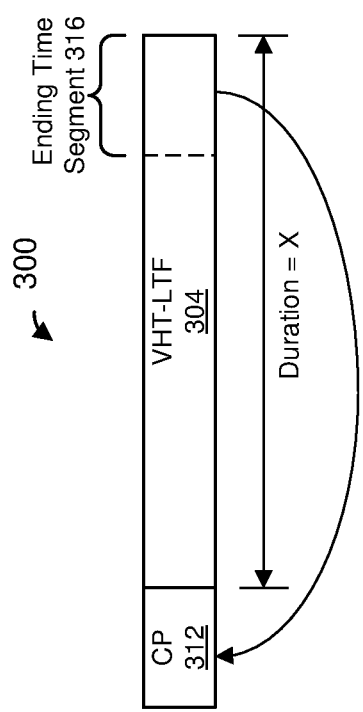
FIG. 3 is a block diagram of an example physical layer (PHY) midamble that may be used with the PPDUs of FIGS. 2A and B, according to an embodiment

FIG. 3 is a diagram of an example of a training signal field 300 that is included in the midamble(s) 256 of FIGS. 2A and B, according to an embodiment. The training signal field 300 includes training signal portion 304 that is based on the VHT-LTF defined by the IEEE 802.11ac Standard. For example, for a 10 MHz PPDU, such as the PPDU 200 of FIG. 2A, the training signal portion 304 is generated as a 2× downclock version of the VHT-LTF defined by the IEEE 802.11ac Standard for 20 MHz PPDUs, according to an embodiment. In another example, for a 20 MHz PPDU, such as the PPDU 270 of FIG. 2B, the training signal portion 304 is generated as a 2× downclock version of the VHT-LTF defined by the IEEE 802.11ac Standard for 40 MHz PPDUs, according to an embodiment.

The cyclic prefix 312 includes a copy of an ending time segment 316 of the second training signal portion 308, according to an embodiment. The cyclic prefix 312 includes another suitable signal in other embodiments. In still other embodiments, the cyclic prefix 312 is omitted.

Figure 4:
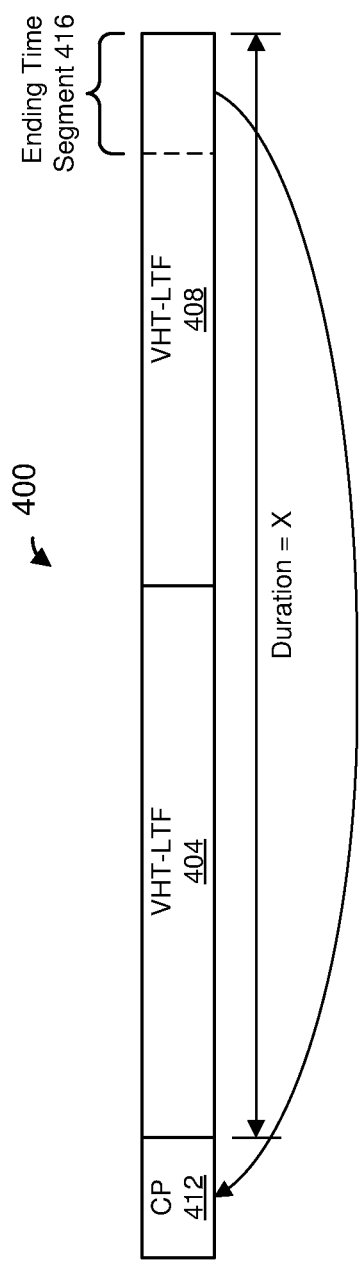
FIG. 4 is a block diagram of another example PHY midamble that may be used with the PPDUs of FIGS. 2A and B, according to another embodiment.

FIG. 4 is a diagram of another example of a training signal field 400 that is included in the midamble(s) 256 of FIGS. 2A and B, according to another embodiment. The training signal field 400 includes a first training signal portion 404, a second training signal portion 408, and a cyclic prefix 412. Each of the first training signal portion 404 and the second training signal portion 408 is based on the VHT-LTF defined by the IEEE 802.11ac Standard. For example, for a 10 MHz PPDU, such as the PPDU 200 of FIG. 2A, each of the first training signal portion 404 and the second training signal portion 408 is generated as a 2× downclock version of the VHT-LTF defined by the IEEE 802.11ac Standard for 20 MHz PPDUs, according to an embodiment. In another example, for a 20 MHz PPDU, such as the PPDU 270 of FIG. 2B, each of the first training signal portion 404 and the second training signal portion 408 is generated as a 2× downclock version of the VHT-LTF defined by the IEEE 802.11ac Standard for 40 MHz PPDUs, according to an embodiment. In an embodiment, each of the first training signal portion 404 and the second training signal portion 408 is the same as the training signal portion 304 of FIG. 3.

The cyclic prefix 412 includes a copy of an ending time segment 416 of the second training signal portion 408, according to an embodiment. The cyclic prefix 412 includes another suitable signal in other embodiments. In still other embodiments, the cyclic prefix 412 is omitted.

Because of the repetition provided by the two training signal portions 404 and 408, the training signal field 400 provides a 3 dB gain as compared to a training signal field with only a single one of the portions 404 and 408. This 3 dB gain provides an effect similar to the power boost applied to the LLTF 220 in the ER mode discussed above.

Comparing the training signal field 400 with the training signal field 300 of FIG. 3, the training signal field 400 has a longer duration than the training signal field 300, according to an embodiment. For example, the duration of the training signal field 400 is longer than a duration of the training signal field 300 by at least a duration of the training signal portion 304, according to an embodiment.

Figure 5:
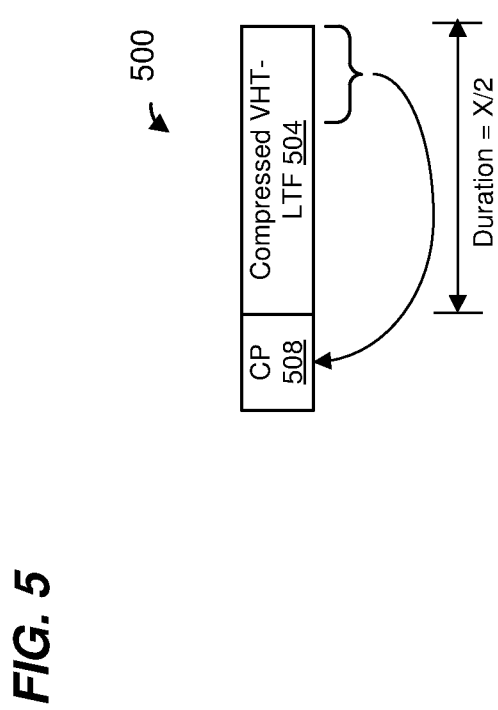
FIG. 5 is a block diagram of another example PHY midamble that may be used with the PPDUs of FIGS. 2A and B, according to another embodiment.

FIG. 5 is a diagram of another example training signal field 500 that is included in the midamble(s) 256 of FIGS. 2A and B, according to yet another embodiment. The training signal field 500 includes a compressed VHT-LTF 504 and a cyclic prefix 508. The cyclic prefix 508 includes a copy of an ending time segment of the compressed VHT-LTF 504, according to an embodiment. The cyclic prefix 508 includes another suitable signal in other embodiments. In still other embodiments, the cyclic prefix 508 is omitted.

The compressed VHT-LTF 504 has a shorter (or compressed) duration as compared to the VHT-LTFs used for midambles described above. In an embodiment, the compressed VHT-LTF 504 is generated by setting every other OFDM tone to zero in the VHT-LTF tone sequence defined by the IEEE 802.11ac Standard prior to performing an IFFT, and after performing the IFFT truncating the resulting time-domain sequence by half. In an embodiment, the IFFT is a 64-tone IFFT for 10 MHz-wide PPDUs, and a 128-tone IFFT for 20 MHz-wide PPDUs.

In another embodiment, the compressed VHT-LTF 504 is generated by applying a smaller-size IFFT to a sequence that includes every other tone value in the VHT-LTF tone sequence defined by the IEEE 802.11ac Standard. For example, in an embodiment, a 32-tone IFFT is used for 10 MHz-wide PPDUs, and a 128-tone IFFT is used for 20 MHz-wide PPDUs.

Because the compressed VHT-LTF 504 has a shorter (or compressed) duration as compared to other VHT-LTFs used for midambles described above, less communication medium time is consumed for overhead (as compared to other VHT-LTFs used for midambles described above), allowing more communication medium time for transmission of user data.

Comparing the training signal field 500 with the training signal field 300 of FIG. 3, the training signal field 500 has a shorter duration than the training signal field 300, according to an embodiment. For example, the duration of the training signal field 500 is shorter than the duration of training signal field 300 by at least one half of the duration of the training signal portion 304, according to an embodiment.

Referring now to FIGS. 3-5, in an illustrative embodiment, the training signal field 300, excluding the cyclic prefix 312, has a duration of X, where X is a suitable time duration; the training signal field 400, excluding the cyclic prefix 412, has a duration of 2X; and the training signal field 500, excluding the cyclic prefix 508, has a duration of X/2. The training signal field 500 may be referred to as a compressed training signal field, whereas the training signal field 300 and the training signal field 400 may be referred to as uncompressed training signal fields. In an embodiment, X is equal to the duration of the VHT-LTF defined by the IEEE 802.11ac Standard times two. In another embodiment, X is equal to the duration of the VHT-LTF, without a cyclic prefix, defined by the IEEE 802.11ac Standard times two. In an embodiment, X is 8 microseconds. In other embodiments, X has another suitable duration.

In some embodiments, two or more of the training signal field 300, the training signal 400, and the training signal 500 are used in a single communication protocol for vehicular communications. For example, in some embodiments, two or more of the training signal field 300, the training signal 400, and the training signal 500 are used in respective transmission modes defined by the communication protocol for vehicular communications. As an illustrative embodiment, the training signal 400 is used for the ER transmission mode, the training signal 500 is used for the high throughput mode, and the training signal 400 is used for another transmission mode (e.g., a normal mode, a default mode, etc.) different than the ER transmission mode and the high throughput mode.

Figure 6:
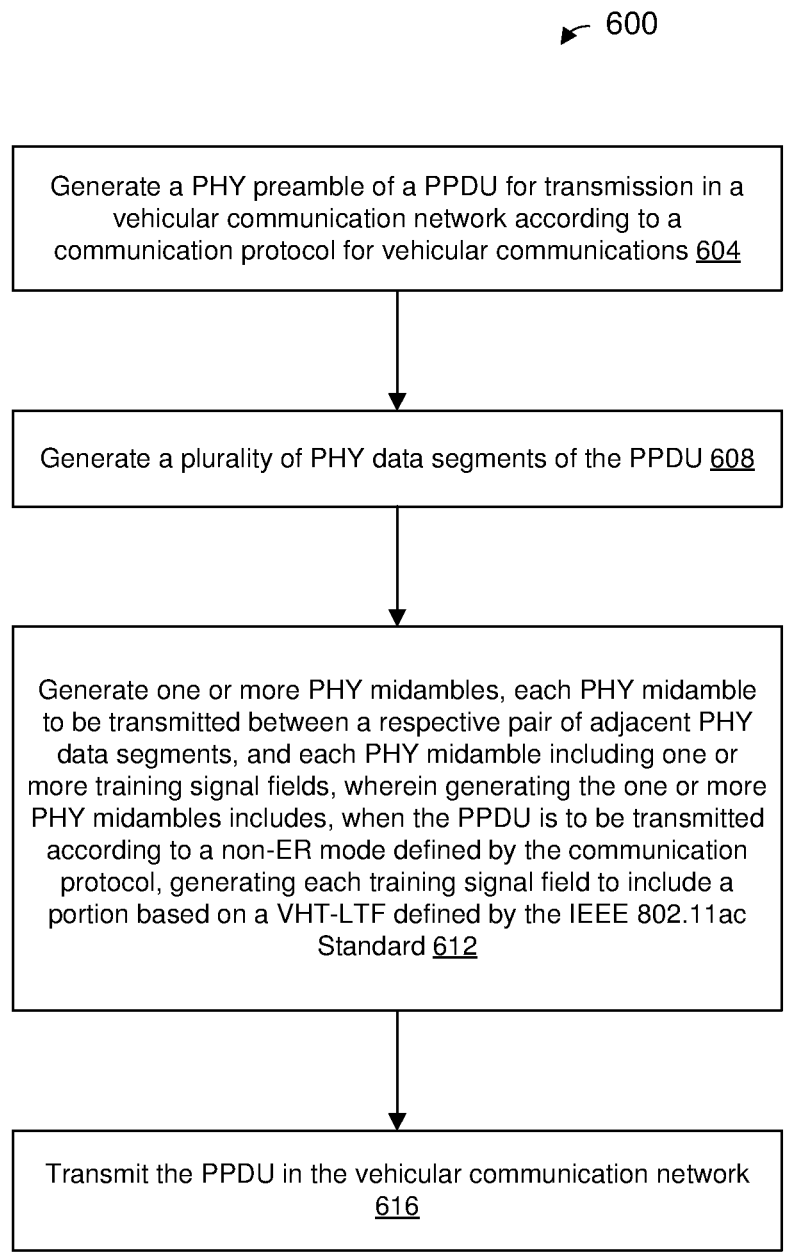
FIG. 6 is a flow diagram of an example method for transmitting a PPDU in the vehicular communication network of FIG. 1, according to an embodiment.

FIG. 6 is a flow diagram of an example method 600 for wireless communication in a vehicular communication network, according to an embodiment. With reference to FIG. 1, the method 600 is implemented by a network interface device such as the network interface device 122 or the network interface device 162, in various embodiments. For example, in one such embodiment, a PHY processor such as the PHY processor 130 or the PHY processor 170 is configured to implement the method 600. In other embodiments, the method 600 is implemented by another suitable communication device.

At block 604, a communication device generates (e.g., the network interface device 122 generates, the PHY processor 130 generates, the network interface device 162 generates, the PHY processor 170 generates, etc.) a PHY preamble of a PPDU for transmission in a vehicular communication network according to a communication protocol for vehicular communications. For example, the communication device generates (e.g., the network interface device 122 generates, the PHY processor 130 generates, the network interface device 162 generates, the PHY processor 170 generates, etc.) a PHY preamble such as the PHY preamble 204 described with reference to FIG. 2A, the PHY preamble 274 described with reference to FIG. 2B, or another suitable PHY preamble, according to various embodiments.

At block 608, the communication device generates (e.g., the network interface device 122 generates, the PHY processor 130 generates, the network interface device 162 generates, the PHY processor 170 generates, etc.) plurality of PHY data segments of the PPDU. For example, the communication device generates (e.g., the network interface device 122 generates, the PHY processor 130 generates, the network interface device 162 generates, the PHY processor 170 generates, etc.) PHY data segments such as the PHY data segments 252 described with reference to FIGS. 2A and 2B, or another suitable PHY preamble, according to various embodiments.

At block 612, the communication device generates (e.g., the network interface device 122 generates, the PHY processor 130 generates, the PHY midamble generator 142 generates, the network interface device 162 generates, the PHY processor 170 generates, the PHY midamble generator 192 generates, etc.) one or more PHY midambles of the PPDU, each PHY midamble to be transmitted between a respective pair of adjacent PHY data segments generated at block 608. Each PHY midamble includes one or more training signal fields, and generating the one or more PHY midambles at block 612 includes generating each training signal field to include a portion based on a VHT-LTF defined by the IEEE 802.11ac Standard.

In an embodiment, for a 10 MHz PPDU, such as the PPDU 200 of FIG. 2A, generating the one or more PHY midambles at block 612 includes generating each training signal field to include a 2× downclock version of the VHT-LTF defined by the IEEE 802.11ac Standard for 20 MHz PPDUs. In an embodiment, for a 20 MHz PPDU, such as the PPDU 270 of FIG. 2B, generating the one or more PHY midambles at block 612 includes generating each training signal field to include a 2× downclock version of the VHT-LTF defined by the IEEE 802.11ac Standard for 40 MHz PPDUs.

In an embodiment, generating the one or more PHY midambles at block 612 includes generating each midamble to include the training signal field 300 described with reference to FIG. 3.

In an embodiment, generating the one or more PHY midambles at block 612 includes generating each training signal field to include the portion based on the VHT-LTF defined by the IEEE 802.11ac Standard when the PPDU is to be transmitted according to a non-ER mode defined by the communication protocol. In another embodiment, generating the one or more PHY midambles at block 612 includes generating each training signal field to include the portion based on the VHT-LTF defined by the IEEE 802.11ac Standard in response to the communication device determining that the PPDU is to be transmitted according to a non-ER mode defined by the communication protocol. In other embodiments, when the PPDU is to be transmitted according any one of multiple modes (including the ER mode) defined by the communication protocol, each training signal field is generated at block 612 to include the portion based on the VHT-LTF defined by the IEEE 802.11ac Standard.

At block 616, the communication device transmits (e.g., the network interface device 122 transmits, the PHY processor 130 transmits, the network interface device 162 transmits, the PHY processor 170 transmits, etc.) the PPDU in the vehicular communication network. In an embodiment, transmitting the PPDU at block 616 includes transmitting the PHY preamble generated at block 604, transmitting the PHY data segments generated at block 608, and transmitting the one or more PHY midambles generated at block 612 between respective pairs of adjacent PHY data segments generated at block 608.

Figure 7:
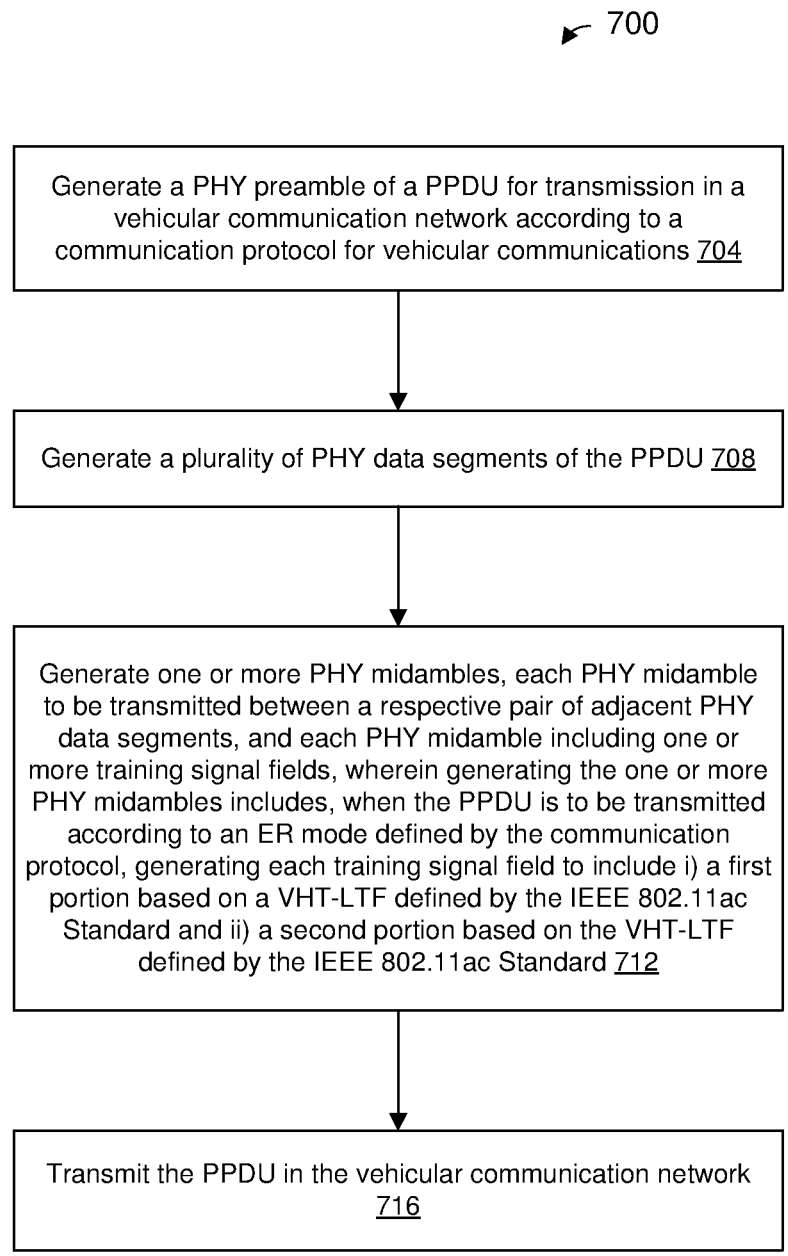
FIG. 7 is a flow diagram of an example method for transmitting a PPDU in the vehicular communication network of FIG. 1, according to another embodiment.

FIG. 7 is a flow diagram of another example method 700 for wireless communication in a vehicular communication network, according to another embodiment. With reference to FIG. 1, the method 700 is implemented by a network interface device such as the network interface device 122 or the network interface device 162, in various embodiments. For example, in one such embodiment, a PHY processor such as the PHY processor 130 or the PHY processor 170 is configured to implement the method 700. In other embodiments, the method 700 is implemented by another suitable communication device.

At block 704, a communication device generates (e.g., the network interface device 122 generates, the PHY processor 130 generates, the network interface device 162 generates, the PHY processor 170 generates, etc.) a PHY preamble of a PPDU for transmission in a vehicular communication network according to a communication protocol for vehicular communications. For example, the communication device generates (e.g., the network interface device 122 generates, the PHY processor 130 generates, the network interface device 162 generates, the PHY processor 170 generates, etc.) a PHY preamble such as the PHY preamble 204 described with reference to FIG. 2A, the PHY preamble 274 described with reference to FIG. 2B, or another suitable PHY preamble, according to various embodiments.

At block 708, the communication device generates (e.g., the network interface device 122 generates, the PHY processor 130 generates, the network interface device 162 generates, the PHY processor 170 generates, etc.) plurality of PHY data segments of the PPDU. For example, the communication device generates (e.g., the network interface device 122 generates, the PHY processor 130 generates, the network interface device 162 generates, the PHY processor 170 generates, etc.) PHY data segments such as the PHY data segments 252 described with reference to FIGS. 2A and 2B, or another suitable PHY preamble, according to various embodiments.

At block 712, the communication device generates (e.g., the network interface device 122 generates, the PHY processor 130 generates, the PHY midamble generator 142 generates, the network interface device 162 generates, the PHY processor 170 generates, the PHY midamble generator 192 generates, etc.) one or more PHY midambles of the PPDU, each PHY midamble to be transmitted between a respective pair of adjacent PHY data segments generated at block 708. Each PHY midamble includes one or more training signal fields, and generating the one or more PHY midambles at block 712 includes generating each training signal field to include i) a first portion based on a VHT-LTF defined by the IEEE 802.11ac Standard and ii) a second portion based on the VHT-LTF defined by the IEEE 802.11ac Standard.

In an embodiment, for a 10 MHz PPDU, such as the PPDU 200 of FIG. 2A, generating the one or more PHY midambles at block 712 includes generating each of the first portion and the second portion of each training signal field to include a 2× downclock version of the VHT-LTF defined by the IEEE 802.11ac Standard for 20 MHz PPDUs. In an embodiment, for a 20 MHz PPDU, such as the PPDU 270 of FIG. 2B, generating the one or more PHY midambles at block 712 includes generating each of the first portion and the second portion of each training signal field to include a 2× downclock version of the VHT-LTF defined by the IEEE 802.11ac Standard for 40 MHz PPDUs.

In an embodiment, generating the one or more PHY midambles at block 712 includes generating each midamble to include the training signal field 400 described with reference to FIG. 4.

In an embodiment, generating the one or more PHY midambles at block 712 includes generating each training signal field to include i) the first portion based on a VHT-LTF defined by the IEEE 802.11ac Standard and ii) the second portion based on the VHT-LTF defined by the IEEE 802.11ac Standard when the PPDU is to be transmitted according to an ER mode defined by the communication protocol. In another embodiment, generating the one or more PHY midambles at block 712 includes generating each training signal field to include i) the first portion based on a VHT-LTF defined by the IEEE 802.11ac Standard and ii) the second portion based on the VHT-LTF defined by the IEEE 802.11ac Standard in response to the communication device determining that the PPDU is to be transmitted according to the ER mode defined by the communication protocol. In other embodiments, when the PPDU is to be transmitted according any one of multiple modes (including a non-ER mode) defined by the communication protocol, each training signal field is generated at block 712 to include i) the first portion based on a VHT-LTF defined by the IEEE 802.11ac Standard and ii) the second portion based on the VHT-LTF defined by the IEEE 802.11ac Standard.

At block 716, the communication device transmits (e.g., the network interface device 122 transmits, the PHY processor 130 transmits, the network interface device 162 transmits, the PHY processor 170 transmits, etc.) the PPDU in the vehicular communication network. In an embodiment, transmitting the PPDU at block 716 includes transmitting the PHY preamble generated at block 704, transmitting the PHY data segments generated at block 708, and transmitting the one or more PHY midambles generated at block 712 between respective pairs of adjacent PHY data segments generated at block 708.

Figure 8:
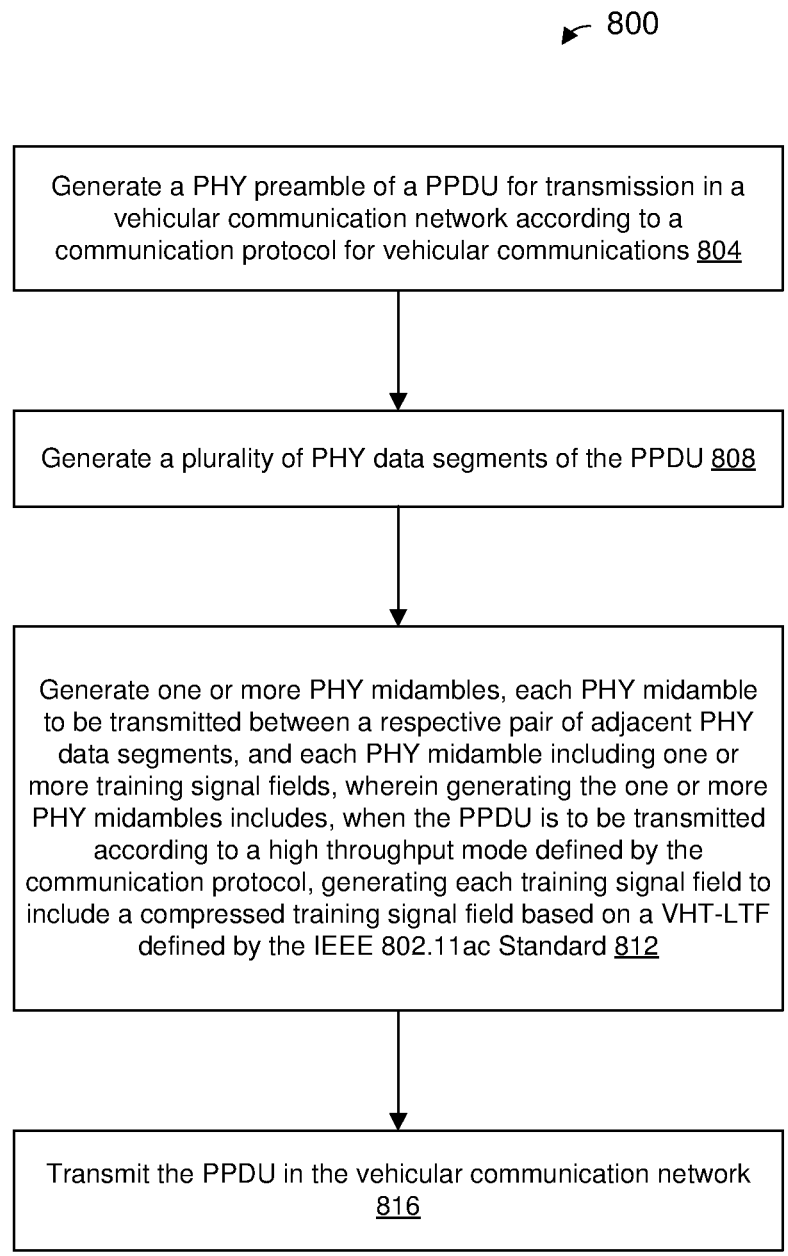
FIG. 8 is a flow diagram of yet another example method for transmitting a PPDU in the vehicular communication network of FIG. 1, according to another embodiment.

FIG. 8 is a flow diagram of yet another example method 800 for wireless communication in a vehicular communication network, according to another embodiment. With reference to FIG. 1, the method 800 is implemented by a network interface device such as the network interface device 122 or the network interface device 162, in various embodiments. For example, in one such embodiment, a PHY processor such as the PHY processor 130 or the PHY processor 170 is configured to implement the method 800. In other embodiments, the method 800 is implemented by another suitable communication device.

At block 804, a communication device generates (e.g., the network interface device 122 generates, the PHY processor 130 generates, the network interface device 162 generates, the PHY processor 170 generates, etc.) a PHY preamble of a PPDU for transmission in a vehicular communication network according to a communication protocol for vehicular communications. For example, the communication device generates (e.g., the network interface device 122 generates, the PHY processor 130 generates, the network interface device 162 generates, the PHY processor 170 generates, etc.) a PHY preamble such as the PHY preamble 204 described with reference to FIG. 2A, the PHY preamble 274 described with reference to FIG. 2B, or another suitable PHY preamble, according to various embodiments.

At block 808, the communication device generates (e.g., the network interface device 122 generates, the PHY processor 130 generates, the network interface device 162 generates, the PHY processor 170 generates, etc.) plurality of PHY data segments of the PPDU. For example, the communication device generates (e.g., the network interface device 122 generates, the PHY processor 130 generates, the network interface device 162 generates, the PHY processor 170 generates, etc.) PHY data segments such as the PHY data segments 252 described with reference to FIGS. 2A and 2B, or another suitable PHY preamble, according to various embodiments.

At block 812, the communication device generates (e.g., the network interface device 122 generates, the PHY processor 130 generates, the PHY midamble generator 142 generates, the network interface device 162 generates, the PHY processor 170 generates, the PHY midamble generator 192 generates, etc.) one or more PHY midambles of the PPDU, each PHY midamble to be transmitted between a respective pair of adjacent PHY data segments generated at block 808. Each PHY midamble includes one or more training signal fields, and generating the one or more PHY midambles at block 812 includes generating each training signal field to include a compressed training signal field based on a VHT-LTF defined by the IEEE 802.11ac Standard.

In an embodiment, the compressed training signal field generated at block 812 is generated by setting every other OFDM tone to zero in the VHT-LTF tone sequence defined by the IEEE 802.11ac Standard prior to performing an IFFT, and after performing the IFFT truncating the resulting time-domain sequence by half. In an embodiment, the IFFT is a 64-tone IFFT for 10 MHz-wide PPDUs, and a 128-tone IFFT for 20 MHz-wide PPDUs.

In another embodiment, the compressed training signal field generated at block 812 is generated by applying a smaller-size IFFT to a sequence that includes every other tone value in the VHT-LTF tone sequence defined by the IEEE 802.11ac Standard. For example, in an embodiment, a 32-tone IFFT is used for 10 MHz-wide PPDUs, and a 128-tone IFFT is used for 20 MHz-wide PPDUs.

In an embodiment, generating the one or more PHY midambles at block 812 includes generating each midamble to include the training signal field 500 described with reference to FIG. 5.

In an embodiment, generating the one or more PHY midambles at block 812 includes generating each training signal field to include the compressed training signal field when the PPDU is to be transmitted according to the high throughput mode defined by the communication protocol. In another embodiment, generating the one or more PHY midambles at block 812 includes generating each training signal field to include the compressed training signal field in response to the communication device determining that the PPDU is to be transmitted according to the high throughput mode defined by the communication protocol. In other embodiments, when the PPDU is to be transmitted according any one of multiple modes (including a non-high throughput mode) defined by the communication protocol, each training signal field is generated at block 612 to include the compressed training signal field.

At block 816, the communication device transmits (e.g., the network interface device 122 transmits, the PHY processor 130 transmits, the network interface device 162 transmits, the PHY processor 170 transmits, etc.) the PPDU in the vehicular communication network. In an embodiment, transmitting the PPDU at block 816 includes transmitting the PHY preamble generated at block 804, transmitting the PHY data segments generated at block 808, and transmitting the one or more PHY midambles generated at block 812 between respective pairs of adjacent PHY data segments generated at block 808.

In some embodiments, two or more of the method 600, the method 700, and the method 800 are implemented by a communication device operating according to a single communication protocol for vehicular communications. For example, in some embodiments, two or more of the method 600, the method 700, and the method 800 are performed in connection with transmitting different packets according to respective transmission modes defined by the communication protocol for vehicular communications. As an illustrative embodiment, the method 700 is performed when transmitting a packet according to the ER transmission mode, the method 800 is performed when transmitting a packet according to the high throughput mode, and the method 600 is performed when transmitting a packet according to another transmission mode (e.g., a normal mode, a default mode, etc.) different than the ER transmission mode and the high throughput mode.

Figure 9:
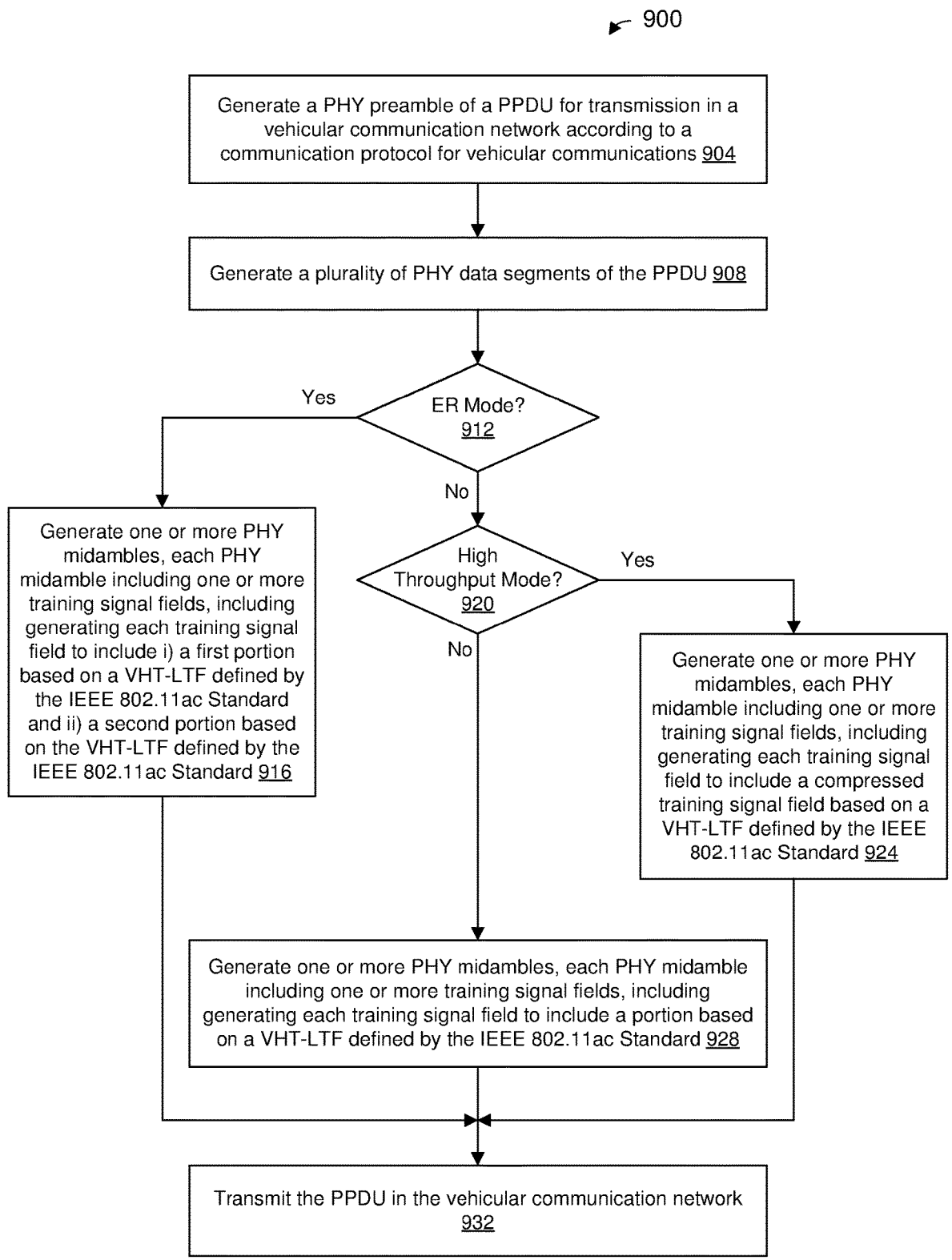
FIG. 9 is a flow diagram of still another example method for transmitting a PPDU in the vehicular communication network of FIG. 1, according to another embodiment.

FIG. 9 is a flow diagram of yet another example method 900 for wireless communication in a vehicular communication network, according to another embodiment. With reference to FIG. 1, the method 900 is implemented by a network interface device such as the network interface device 122 or the network interface device 162, in various embodiments. For example, in one such embodiment, a PHY processor such as the PHY processor 130 or the PHY processor 170 is configured to implement the method 900. In other embodiments, the method 900 is implemented by another suitable communication device.

At block 904, a communication device generates (e.g., the network interface device 122 generates, the PHY processor 130 generates, the network interface device 162 generates, the PHY processor 170 generates, etc.) a PHY preamble of a PPDU for transmission in a vehicular communication network according to a communication protocol for vehicular communications. For example, the communication device generates (e.g., the network interface device 122 generates, the PHY processor 130 generates, the network interface device 162 generates, the PHY processor 170 generates, etc.) a PHY preamble such as the PHY preamble 204 described with reference to FIG. 2A, the PHY preamble 274 described with reference to FIG. 2B, or another suitable PHY preamble, according to various embodiments.

At block 908, the communication device generates (e.g., the network interface device 122 generates, the PHY processor 130 generates, the network interface device 162 generates, the PHY processor 170 generates, etc.) plurality of PHY data segments of the PPDU. For example, the communication device generates (e.g., the network interface device 122 generates, the PHY processor 130 generates, the network interface device 162 generates, the PHY processor 170 generates, etc.) PHY data segments such as the PHY data segments 252 described with reference to FIGS. 2A and 2B, or another suitable PHY preamble, according to various embodiments.

At block 912, the communication device determines (e.g., the network interface device 122 determines, the PHY processor 130 determines, the network interface device 162 determines, the PHY processor 170 determines, etc.) whether the PPDU is to be transmitted according to an ER mode. In response to the communication device determining that the PPDU is to be transmitted according to the ER mode, the flow proceeds to block 916.

At block 916, the communication device generates (e.g., the network interface device 122 generates, the PHY processor 130 generates, the PHY midamble generator 142 generates, the network interface device 162 generates, the PHY processor 170 generates, the PHY midamble generator 192 generates, etc.) one or more PHY midambles of the PPDU, each PHY midamble to be transmitted between a respective pair of adjacent PHY data segments generated at block 908. Each PHY midamble includes one or more training signal fields, and generating the one or more PHY midambles at block 916 includes generating each training signal field to include i) a first portion based on a VHT-LTF defined by the IEEE 802.11ac Standard and ii) a second portion based on the VHT-LTF defined by the IEEE 802.11ac Standard.

In an embodiment, for a 10 MHz PPDU, such as the PPDU 200 of FIG. 2A, generating the one or more PHY midambles at block 916 includes generating each of the first portion and the second portion of each training signal field to include a 2× downclock version of the VHT-LTF defined by the IEEE 802.11ac Standard for 20 MHz PPDUs. In an embodiment, for a 20 MHz PPDU, such as the PPDU 270 of FIG. 2B, generating the one or more PHY midambles at block 916 includes generating each of the first portion and the second portion of each training signal field to include a 2× downclock version of the VHT-LTF defined by the IEEE 802.11ac Standard for 40 MHz PPDUs.

In an embodiment, generating the one or more PHY midambles at block 916 includes generating each midamble to include the training signal field 400 described with reference to FIG. 4.

In an embodiment, generating the one or more PHY midambles at block 916 includes generating each training signal field to include i) the first portion based on a VHT-LTF defined by the IEEE 802.11ac Standard and ii) the second portion based on the VHT-LTF defined by the IEEE 802.11ac Standard when the PPDU is to be transmitted according to an ER mode defined by the communication protocol. In another embodiment, generating the one or more PHY midambles at block 916 includes generating each training signal field to include i) the first portion based on a VHT-LTF defined by the IEEE 802.11ac Standard and ii) the second portion based on the VHT-LTF defined by the IEEE 802.11ac Standard in response to the communication device determining that the PPDU is to be transmitted according to the ER mode defined by the communication protocol. In other embodiments, when the PPDU is to be transmitted according any one of multiple modes (including a non-ER mode) defined by the communication protocol, each training signal field is generated at block 916 to include i) the first portion based on a VHT-LTF defined by the IEEE 802.11ac Standard and ii) the second portion based on the VHT-LTF defined by the IEEE 802.11ac Standard.

On the other hand, in response to the communication device determining at block 912 that the PPDU is not to be transmitted according to the ER mode, the flow proceeds to block 920. At block 920, the communication device determines (e.g., the network interface device 122 determines, the PHY processor 130 determines, the network interface device 162 determines, the PHY processor 170 determines, etc.) whether the PPDU is to be transmitted according to a high throughput mode. In response to the communication device determining that the PPDU is to be transmitted according to the high throughput mode, the flow proceeds to block 924.

At block 924, the communication device generates (e.g., the network interface device 122 generates, the PHY processor 130 generates, the PHY midamble generator 142 generates, the network interface device 162 generates, the PHY processor 170 generates, the PHY midamble generator 192 generates, etc.) one or more PHY midambles of the PPDU, each PHY midamble to be transmitted between a respective pair of adjacent PHY data segments generated at block 908. Each PHY midamble includes one or more training signal fields, and generating the one or more PHY midambles at block 924 includes generating each training signal field to include a compressed training signal field based on a VHT-LTF defined by the IEEE 802.11ac Standard.

In an embodiment, the compressed training signal field generated at block 924 is generated by setting every other OFDM tone to zero in the VHT-LTF tone sequence defined by the IEEE 802.11ac Standard prior to performing an IFFT, and after performing the IFFT truncating the resulting time-domain sequence by half. In an embodiment, the IFFT is a 64-tone IFFT for 10 MHz-wide PPDUs, and a 128-tone IFFT for 20 MHz-wide PPDUs.

In another embodiment, the compressed training signal field generated at block 924 is generated by applying a smaller-size IFFT to a sequence that includes every other tone value in the VHT-LTF tone sequence defined by the IEEE 802.11ac Standard. For example, in an embodiment, a 32-tone IFFT is used for 10 MHz-wide PPDUs, and a 128-tone IFFT is used for 20 MHz-wide PPDUs.

In an embodiment, generating the one or more PHY midambles at block 924 includes generating each midamble to include the training signal field 500 described with reference to FIG. 5.

On the other hand, in response to the communication device determining at block 920 that the PPDU is not to be transmitted according to the high throughput mode, the flow proceeds to block 928. At block 928, the communication device generates (e.g., the network interface device 122 generates, the PHY processor 130 generates, the PHY midamble generator 142 generates, the network interface device 162 generates, the PHY processor 170 generates, the PHY midamble generator 192 generates, etc.) one or more PHY midambles of the PPDU, each PHY midamble to be transmitted between a respective pair of adjacent PHY data segments generated at block 908. Each PHY midamble includes one or more training signal fields, and generating the one or more PHY midambles at block 928 includes generating each training signal field to include a portion based on a VHT-LTF defined by the IEEE 802.11ac Standard.

In an embodiment, for a 10 MHz PPDU, such as the PPDU 200 of FIG. 2A, generating the one or more PHY midambles at block 928 includes generating each training signal field to include a 2× downclock version of the VHT-LTF defined by the IEEE 802.11ac Standard for 20 MHz PPDUs. In an embodiment, for a 20 MHz PPDU, such as the PPDU 270 of FIG. 2B, generating the one or more PHY midambles at block 928 includes generating each training signal field to include a 2× downclock version of the VHT-LTF defined by the IEEE 802.11ac Standard for 40 MHz PPDUs.

In an embodiment, generating the one or more PHY midambles at block 928 includes generating each midamble to include the training signal field 300 described with reference to FIG. 3.

At block 932, the communication device transmits (e.g., the network interface device 122 transmits, the PHY processor 130 transmits, the network interface device 162 transmits, the PHY processor 170 transmits, etc.) the PPDU in the vehicular communication network. In an embodiment, transmitting the PPDU at block 932 includes transmitting the PHY preamble generated at block 904, transmitting the PHY data segments generated at block 908, and transmitting the one or more PHY midambles generated at blocks 916, 924, or 928 between respective pairs of adjacent PHY data segments generated at block 908.

In various embodiments, the method 900 is modified by changing the order of blocks, omitting blocks, adding additional blocks, etc. As an illustrative example, the order of blocks 912 and 920 is switched, according to another embodiment. As another illustrative example, the block 912 may be replaced with a similar block that checks whether the PPDU is to be transmitted according to a mode (e.g., a third transmission mode) different than the ER mode and the high throughput mode is to be used, and the positions of blocks 916 and 928 may be swapped, according to another embodiment. Similarly, as another illustrative example, the block 920 may be replaced with a similar block that checks whether the PPDU is to be transmitted according to a mode (e.g., a third transmission mode) different than the ER mode and the high throughput mode is to be used, and the positions of blocks 920 and 928 may be swapped, according to another embodiment.

Embodiment 1: A method for wireless communication in a vehicular communication network, the method comprising: generating, at a communication device, a PHY preamble of a PPDU for transmission in the vehicular communication network according to a communication protocol for vehicular communications; generating, at the communication device, a plurality of PHY data segments of the PPDU;

generating, at the communication device, one or more PHY midambles, each PHY midamble to be transmitted between a respective pair of adjacent PHY data segments, and each PHY midamble including one or more training signal fields, wherein generating the one or more PHY midambles includes, when the PPDU is to be transmitted according to an ER mode defined by the communication protocol, generating each training signal field to include i) a first portion based on a VHT-LTF defined by the IEEE 802.11ac Standard and ii) a second portion based on the VHT-LTF defined by the IEEE 802.11ac Standard; and transmitting, by the communication device, the PPDU in the vehicular communication network.

Embodiment 2: The method of embodiment 1, wherein generating the one or more PHY midambles further includes, when the PPDU is to be transmitted according to the ER mode defined by the communication protocol, generating each training signal field to further include a cyclic prefix.

Embodiment 3: The method of embodiment 2, wherein generating each training signal field to include the cyclic prefix includes generating each training signal field to include an ending time segment of the second portion of the training signal field.

Embodiment 4: The method of any of embodiments 1-3, wherein generating the one or more PHY midambles further includes, when the PPDU is to be transmitted according to the ER mode defined by the communication protocol, generating each training signal field to include, as the first portion, a downclocked version of the VHT-LTF defined by the IEEE 802.11ac Standard, and to include, as the second portion, the downclocked version of the VHT-LTF defined by the IEEE 802.11ac Standard.

Embodiment 5: The method of any of embodiments 1-4, wherein generating the one or more PHY midambles includes, when the PPDU is to be transmitted according to another mode defined by the communication protocol and different than the ER mode, generating each training signal field to include the first portion and omit the second portion.

Embodiment 6: The method of any of embodiments 1-4, wherein generating the one or more PHY midambles includes, when the PPDU is to be transmitted according to another mode defined by the communication protocol and different than the ER mode, generating each training signal field to include a time compressed training signal based on the VHT-LTF defined by the IEEE 802.11ac Standard, the time compressed training signal having a duration that is shorter than a duration of the first portion included when the PPDU is to be transmitted according to the ER mode.

Embodiment 7: A communication device configured to operate in a vehicular communication network, the communication device comprising: a wireless network interface device. The wireless network interface device includes one or more IC devices configured to: generate a PHY preamble of a PPDU for transmission in the vehicular communication network according to a communication protocol for vehicular communications; generate a plurality of PHY data segments of the PPDU; generate one or more PHY midambles, each PHY midamble to be transmitted between a respective pair of adjacent PHY data segments, and each PHY midamble including one or more training signal fields, wherein generating the one or more PHY midambles includes, when the PPDU is to be transmitted according to an extended range (ER) mode defined by the communication protocol, generating each training signal field to include i) a first portion based on a VHT-LTF defined by the IEEE 802.11ac Standard and ii) a second portion based on the VHT-LTF defined by the IEEE 802.11ac Standard; and control the wireless network interface device to transmit the PPDU in the vehicular communication network.

Embodiment 8: The communication device of embodiment 7, wherein the one or more IC devices are further configured to, when the PPDU is to be transmitted according to the ER mode defined by the communication protocol, generate each training signal field to further include a cyclic prefix.

Embodiment 9: The communication device of embodiment 8, wherein the one or more IC devices are further configured to generate each training signal field to include an ending time segment of the second portion of the training signal field.

Embodiment 10: The communication device of any of embodiments 7-9, wherein the one or more IC devices are further configured to, when the PPDU is to be transmitted according to the ER mode defined by the communication protocol, generate each training signal field to include, as the first portion, a downclocked version of the VHT-LTF defined by the IEEE 802.11ac Standard, and to include, as the second portion, the downclocked version of the VHT-LTF defined by the IEEE 802.11ac Standard.

Embodiment 11: The communication device of any of embodiments 7-10, wherein the one or more IC devices are further configured to, when the PPDU is to be transmitted according to another mode defined by the communication protocol and different than the ER mode, generate each training signal field to include the first portion and omit the second portion.

Embodiment 12: The communication device of any of embodiments 7-10, wherein the one or more IC devices are further configured to, when the PPDU is to be transmitted according to another mode defined by the communication protocol and different than the ER mode, generate each training signal field to include a time compressed training signal based on the VHT-LTF defined by the IEEE 802.11ac Standard, the time compressed training signal having a duration that is shorter than a duration of the first portion included when the PPDU is to be transmitted according to the ER mode.

Embodiment 13: A method for accessing a communication channel in a vehicular communication network, the method comprising: generating, at a communication device, a PHY preamble of a PPDU for transmission in the vehicular communication network according to a communication protocol for vehicular communications; generating, at the communication device, a plurality of PHY data segments of the PPDU; selecting, at the communication device, a format of one or more PHY midambles from a set of multiple different PHY midamble formats based on a mode of transmission of the PPDU, wherein the set of multiple different PHY midamble formats includes i) a first format corresponding to an extended range transmission mode defined by the communication protocol, the first format using uncompressed training signal fields, and ii) a second format corresponding to a high throughput transmission mode defined by the communication protocol, the second format using compressed training signal fields; generating, at the communication device, the one or more PHY midambles according to the selected format, each PHY midamble to be transmitted between a respective pair of adjacent PHY data segments, and each PHY midamble including one or more training signal fields, wherein generating each PHY midamble includes i) selectively including an uncompressed training signal field when the first format is selected, and ii) selectively including a compressed training signal field when the second format is selected; and transmitting, by the communication device, the PPDU in the vehicular communication network.

Embodiment 14: The method of embodiment 13, wherein generating the one or more PHY midambles according to the selected format comprises, when the PPDU is to be transmitted according to the ER mode defined by the communication protocol: generating each training signal field to include i) a first portion based on a VHT-LTF defined by the IEEE 802.11ac Standard and ii) a second portion based on the VHT-LTF defined by the IEEE 802.11ac Standard.

Embodiment 15: The method of embodiment 14, wherein generating the one or more PHY midambles further includes, when the PPDU is to be transmitted according to the ER mode defined by the communication protocol, generating each training signal field to include, as the first portion, a downclocked version of the VHT-LTF defined by the IEEE 802.11ac Standard, and to include, as the second portion, the downclocked version of the VHT-LTF defined by the IEEE 802.11ac Standard.

Embodiment 16: The method of any of embodiments 13-15, wherein generating the one or more PHY midambles according to the selected format comprises, when the PPDU is to be transmitted according to the high throughput mode defined by the communication protocol: generating each training signal field to include a time compressed training signal based on the VHT-LTF defined by the IEEE 802.11ac Standard, each training signal field having a time duration that is shorter than a time duration of each training signal field generated when the PPDU is to be transmitted according to another mode different than the ER mode and different than the high throughput mode.

Embodiment 17: The method of any of embodiments 13-16, wherein generating the one or more PHY midambles according to the selected format comprises, when the PPDU is to be transmitted according to another mode different than the ER mode and different than the high throughput mode: generating each training signal field to include a downclocked version of the VHT-LTF defined by the IEEE 802.11ac Standard, each training signal field having a time duration that is shorter than a time duration of each training signal field generated when the PPDU is to be transmitted according to the ER mode.

Embodiment 18: An apparatus associated with a communication device configured to operate in a vehicular communication network, the apparatus comprising: a wireless network interface device. The wireless network interface device includes one or more IC devices configured to: generate a PHY preamble of a PPDU for transmission in the vehicular communication network according to a communication protocol for vehicular communications; generate a plurality of PHY data segments of the PPDU; select a format of one or more PHY midambles from a set of multiple different PHY midamble formats based on a mode of transmission of the PPDU, wherein the set of multiple different PHY midamble formats includes i) a first format corresponding to an extended range transmission mode defined by the communication protocol, the first format using uncompressed training signal fields, and ii) a second format corresponding to a high throughput transmission mode defined by the communication protocol, the second format using compressed training signal fields; generate the one or more PHY midambles according to the selected format, each PHY midamble to be transmitted between a respective pair of adjacent PHY data segments, and each PHY midamble including one or more training signal fields, wherein generating each PHY midamble includes i) selectively including an uncompressed training signal field when the first format is selected, and ii) selectively including a compressed training signal field when the second format is selected; and control the wireless network interface device to transmit the PPDU in the vehicular communication network.

Embodiment 19: The communication device of embodiment 18, wherein the one or more IC devices are configured to, when the PPDU is to be transmitted according to the ER mode defined by the communication protocol: generate each training signal field to include i) a first portion based on a VHT-LTF defined by the IEEE 802.11ac Standard and ii) a second portion based on the VHT-LTF defined by the IEEE 802.11ac Standard.

Embodiment 20: The communication device of embodiment 19, wherein the one or more IC devices are configured to, when the PPDU is to be transmitted according to the ER mode defined by the communication protocol, generate each training signal field to include, as the first portion, a downclocked version of the VHT-LTF defined by the IEEE 802.11ac Standard, and to include, as the second portion, the downclocked version of the VHT-LTF defined by the IEEE 802.11ac Standard.

Embodiment 21: The communication device of any of embodiments 18-20, wherein the one or more IC devices are configured to, when the PPDU is to be transmitted according to the high throughput mode defined by the communication protocol: generate each training signal field to include a time compressed training signal based on the VHT-LTF defined by the IEEE 802.11ac Standard, each training signal field having a time duration that is shorter than a time duration of each training signal field generated when the PPDU is to be transmitted according to another mode different than the ER mode and different than the high throughput mode.

Embodiment 22: The communication device of any of embodiments 18-21, wherein the one or more IC devices are configured to, when the PPDU is to be transmitted according to another mode different than the ER mode and different than the high throughput mode: generate each training signal field to include a downclocked version of the VHT-LTF defined by the IEEE 802.11ac Standard, each training signal field having a time duration that is shorter than a time duration of each training signal field generated when the PPDU is to be transmitted according to the ER mode.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as in a RAM, a ROM, a flash memory, an integrated memory of a processor, etc. The software or firmware instructions may include machine readable instructions that, when executed by the processor, cause the processor to perform various acts.

When implemented in hardware, the hardware may comprise one or more of discrete components, one or more ICs, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for wireless communication in a vehicular communication network, the method comprising:
generating, at a communication device, a physical layer (PHY) preamble of a PHY protocol data unit (PPDU) for transmission in the vehicular communication network according to a communication protocol for vehicular communications;
generating, at the communication device, a plurality of PHY data segments of the PPDU;
generating, at the communication device, one or more PHY midambles, each PHY midamble to be transmitted between a respective pair of adjacent PHY data segments, and each PHY midamble including one or more training signal fields, including:
determining whether the PPDU is to be transmitted according to an extended range (ER) mode defined by the communication protocol, the ER mode being one of multiple modes of transmission defined by the communication protocol, wherein the communication protocol defines respective ones of multiple PHY midamble formats for use with respective modes of transmission among the multiple modes of transmission defined by the communication protocol, and
when it is determined that the PPDU is to be transmitted according to the ER mode defined by the communication protocol, generating the one or more PHY midambles according to a first PHY midamble format among the multiple PHY midamble formats, the first PHY preamble format defined, by the communication protocol, for use with the ER mode, wherein generating the one or more PHY midambles according to the first PHY midamble format includes generating each training signal field to include i) a first portion based on a very high throughput long training field (VHT-LTF) defined by the IEEE 802.11ac Standard and ii) a second portion based on the VHT-LTF defined by the IEEE 802.11ac Standard; and
transmitting, by the communication device, the PPDU in the vehicular communication network.

2. The method of claim 1, wherein generating the one or more PHY midambles further includes, when it is determined that the PPDU is to be transmitted according to the ER mode defined by the communication protocol, generating each training signal field to further include a cyclic prefix.

3. The method of claim 2, wherein generating each training signal field to include the cyclic prefix includes generating each training signal field to include an ending time segment of the second portion of the training signal field.

4. The method of claim 1, wherein generating the one or more PHY midambles further includes, when it is determined that the PPDU is to be transmitted according to the ER mode defined by the communication protocol, generating each training signal field to include, as the first portion, a downclocked version of the VHT-LTF defined by the IEEE 802.11ac Standard, and to include, as the second portion, the downclocked version of the VHT-LTF defined by the IEEE 802.11ac Standard.

5. The method of claim 1, wherein generating the one or more PHY midambles includes, when it is determined that the PPDU is to be transmitted according to another mode defined by the communication protocol and different than the ER mode, generating each training signal field to include the first portion and omit the second portion.

6. The method of claim 1, wherein generating the one or more PHY midambles includes, when it is determined that the PPDU is to be transmitted according to another mode defined by the communication protocol and different than the ER mode, generating each training signal field to include a time compressed training signal based on the VHT-LTF defined by the IEEE 802.11ac Standard, the time compressed training signal having a duration that is shorter than a duration of the first portion included when the PPDU is to be transmitted according to the ER mode.

7. A communication device configured to operate in a vehicular communication network, the communication device comprising:
a wireless network interface device having one or more integrated circuit (IC) devices configured to:
generate a physical layer (PHY) preamble of a PHY protocol data unit (PPDU) for transmission in the vehicular communication network according to a communication protocol for vehicular communications,
generate a plurality of PHY data segments of the PPDU, and
generate one or more PHY midambles, each PHY midamble to be transmitted between a respective pair of adjacent PHY data segments, and each PHY midamble including one or more training signal fields, wherein generating the one or more PHY midambles includes:
determining whether the PPDU is to be transmitted according to an extended range (ER) mode defined by the communication protocol, the ER mode being one of multiple modes of transmission defined by the communication protocol, wherein the communication protocol defines respective ones of multiple PHY midamble formats for use with respective modes of transmission among the multiple modes of transmission defined by the communication protocol, and
when it is determined that the PPDU is to be transmitted according to the ER mode defined by the communication protocol, generating the one or more PHY midambles according to a first PHY midamble format among the multiple PHY midamble formats, the first PHY preamble format defined, by the communication protocol, for use with the ER mode, wherein generating the one or more PHY midambles according to the first PHY midamble format includes generating each training signal field to include i) a first portion based on a very high throughput long training field (VHT-LTF) defined by the IEEE 802.11ac Standard and ii) a second portion based on the VHT-LTF defined by the IEEE 802.11ac Standard;
wherein the one or more IC devices are further configured to control the wireless network interface device to transmit the PPDU in the vehicular communication network.

8. The communication device of claim 7, wherein the one or more IC devices are further configured to, when it is determined that the PPDU is to be transmitted according to the ER mode defined by the communication protocol, generate each training signal field to further include a cyclic prefix.

9. The communication device of claim 8, wherein the one or more IC devices are further configured to generate each training signal field to include an ending time segment of the second portion of the training signal field.

10. The communication device of claim 7, wherein the one or more IC devices are further configured to, when it is determined that the PPDU is to be transmitted according to the ER mode defined by the communication protocol, generate each training signal field to include, as the first portion, a downclocked version of the VHT-LTF defined by the IEEE 802.11ac Standard, and to include, as the second portion, the downclocked version of the VHT-LTF defined by the IEEE 802.11ac Standard.

11. The communication device of claim 7, wherein the one or more IC devices are further configured to, when it is determined that the PPDU is to be transmitted according to another mode defined by the communication protocol and different than the ER mode, generate each training signal field to include the first portion and omit the second portion.

12. The communication device of claim 7, wherein the one or more IC devices are further configured to, when it is determined that the PPDU is to be transmitted according to another mode defined by the communication protocol and different than the ER mode, generate each training signal field to include a time compressed training signal based on the VHT-LTF defined by the IEEE 802.11ac Standard, the time compressed training signal having a duration that is shorter than a duration of the first portion included when the PPDU is to be transmitted according to the ER mode.

13. A method for accessing a communication channel in a vehicular communication network, the method comprising:
    generating, at a communication device, a physical layer (PHY) preamble of a PHY protocol data unit (PPDU) for transmission in the vehicular communication network according to a communication protocol for vehicular communications;
    generating, at the communication device, a plurality of PHY data segments of the PPDU;
    selecting, at the communication device, a format of one or more PHY midambles from a set of multiple different PHY midamble formats based on a mode of transmission of the PPDU, wherein the respective ones of the multiple different PHY midamble formats are defined, by the communication protocol, for use with respective ones of multiple modes of transmission defined by the communication protocol, and wherein the set of multiple different PHY midamble formats includes i) a first format defined, by the communication protocol, for use with an extended range mode defined by the communication protocol, the first format using uncompressed training signal fields, and ii) a second format defined, by the communication protocol, for use with a high throughput mode defined by the communication protocol, the second format using compressed training signal fields;
    generating, at the communication device, the one or more PHY midambles according to the selected format, each PHY midamble to be transmitted between a respective pair of adjacent PHY data segments, and each PHY midamble including one or more training signal fields, wherein generating each PHY midamble includes i) selectively including an uncompressed training signal field when the first format is selected, and ii) selectively including a compressed training signal field when the second format is selected; and
    transmitting, by the communication device, the PPDU in the vehicular communication network.

14. The method of claim 13, wherein generating the one or more PHY midambles according to the selected format comprises, when the PPDU is to be transmitted according to the ER mode defined by the communication protocol:
    generating each training signal field to include i) a first portion based on a very high throughput long training field (VHT-LTF) defined by the IEEE 802.11ac Standard and ii) a second portion based on the VHT-LTF defined by the IEEE 802.11ac Standard.

15. The method of claim 14, wherein generating the one or more PHY midambles further includes, when the PPDU is to be transmitted according to the ER mode defined by the communication protocol, generating each training signal field to include, as the first portion, a downclocked version of the VHT-LTF defined by the IEEE 802.11ac Standard, and to include, as the second portion, the downclocked version of the VHT-LTF defined by the IEEE 802.11ac Standard.

16. The method of claim 13, wherein generating the one or more PHY midambles according to the selected format comprises, when the PPDU is to be transmitted according to the high throughput mode defined by the communication protocol:
    generating each training signal field to include a time compressed training signal based on the VHT-LTF defined by the IEEE 802.11ac Standard, each training signal field having a time duration that is shorter than a time duration of each training signal field generated when the PPDU is to be transmitted according to another mode different than the ER mode and different than the high throughput mode.

17. The method of claim 13, wherein generating the one or more PHY midambles according to the selected format comprises, when the PPDU is to be transmitted according to another mode different than the ER mode and different than the high throughput mode:
    generating each training signal field to include a downclocked version of the VHT-LTF defined by the IEEE 802.11ac Standard, each training signal field having a time duration that is shorter than a time duration of each training signal field generated when the PPDU is to be transmitted according to the ER mode.

18. An apparatus associated with a communication device configured to operate in a vehicular communication network, the apparatus comprising:
    a wireless network interface device having one or more integrated circuit (IC) devices configured to:
        generate a physical layer (PHY) preamble of a PHY protocol data unit (PPDU) for transmission in the vehicular communication network according to a communication protocol for vehicular communications,
        generate a plurality of PHY data segments of the PPDU,
        select a format of one or more PHY midambles from a set of multiple different PHY midamble formats based on a mode of transmission of the PPDU, wherein respective ones of the multiple different PHY midamble formats are defined, by the communication protocol, for use with respective ones of multiple modes of transmission defined by the communication protocol, and wherein the set of multiple different PHY midamble formats includes i) a first format defined, by the communication protocol, for use with an extended range mode defined by the communication protocol, the first format using uncompressed training signal fields, and ii) a second format defined, by the communication protocol, for use with a high throughput mode defined by the communication protocol, the second format using compressed training signal fields, generate the one or more PHY midambles according to the selected format, each PHY midamble to be transmitted between a respective pair of adjacent PHY data segments, and each PHY midamble including one or more training signal fields, wherein generating each PHY midamble includes i) selectively including an uncompressed training signal field when the first format is selected, and ii) selectively including a compressed training signal field when the second format is selected, and control the wireless network interface device to transmit the PPDU in the vehicular communication network.

19. The communication device of claim 18, wherein the one or more IC devices are configured to, when the PPDU is to be transmitted according to the ER mode defined by the communication protocol:

generate each training signal field to include i) a first portion based on a very high throughput long training field (VHT-LTF) defined by the IEEE 802.11ac Standard and ii) a second portion based on the VHT-LTF defined by the IEEE 802.11ac Standard.

20. The communication device of claim 19, wherein the one or more IC devices are configured to, when the PPDU is to be transmitted according to the ER mode defined by the communication protocol, generate each training signal field to include, as the first portion, a downclocked version of the VHT-LTF defined by the IEEE 802.11ac Standard, and to include, as the second portion, the downclocked version of the VHT-LTF defined by the IEEE 802.11ac Standard.

21. The communication device of claim 18, wherein the one or more IC devices are configured to, when the PPDU is to be transmitted according to the high throughput mode defined by the communication protocol:

generate each training signal field to include a time compressed training signal based on the VHT-LTF defined by the IEEE 802.11ac Standard, each training signal field having a time duration that is shorter than a time duration of each training signal field generated when the PPDU is to be transmitted according to another mode different than the ER mode and different than the high throughput mode.

22. The communication device of claim 18, wherein the one or more IC devices are configured to, when the PPDU is to be transmitted according to another mode different than the ER mode and different than the high throughput mode:

generate each training signal field to include a downclocked version of the VHT-LTF defined by the IEEE 802.11ac Standard, each training signal field having a time duration that is shorter than a time duration of each training signal field generated when the PPDU is to be transmitted according to the ER mode.

* * * * *